US011190038B2

(12) United States Patent
Jang et al.

(10) Patent No.: US 11,190,038 B2
(45) Date of Patent: Nov. 30, 2021

(54) ELECTRONIC DEVICE FOR CONTROLLING POWER

(71) Applicant: Samsung Electronics Co., Ltd., Gyeonggi-do (KR)

(72) Inventors: Wonseok Jang, Gyeonggi-do (KR); Jaedeok Cha, Gyeonggi-do (KR); Sangju Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 220 days.

(21) Appl. No.: 16/337,796

(22) PCT Filed: Sep. 28, 2017

(86) PCT No.: PCT/KR2017/010812
§ 371 (c)(1),
(2) Date: Mar. 28, 2019

(87) PCT Pub. No.: WO2018/062894
PCT Pub. Date: Apr. 5, 2018

(65) Prior Publication Data
US 2020/0006952 A1 Jan. 2, 2020

(30) Foreign Application Priority Data
Sep. 28, 2016 (KR) .................. 10-2016-0124946

(51) Int. Cl.
*H02J 7/00* (2006.01)
*G06F 1/26* (2006.01)
(Continued)

(52) U.S. Cl.
CPC .............. *H02J 7/008* (2013.01); *G06F 1/263* (2013.01); *H02J 7/0029* (2013.01);
(Continued)

(58) Field of Classification Search
CPC .. H02J 7/00; H02J 7/008; H02J 7/0026; H02J 7/0045
See application file for complete search history.

(56) References Cited

U.S. PATENT DOCUMENTS

2008/0172566 A1* 7/2008 Park .................... G06F 1/263
713/310
2008/0201583 A1 8/2008 Fujiwara et al.
(Continued)

FOREIGN PATENT DOCUMENTS

KR 1020080066287 7/2008
KR 1020140051613 5/2014
(Continued)

OTHER PUBLICATIONS

PCT/ISA/210 Search Report issued on PCT/KR2017/010812 (pp. 6).
PCT/ISA/237 Written Opinion issued on PCT/KR2017/010812 (pp. 6).

*Primary Examiner* — Robert Grant
(74) *Attorney, Agent, or Firm* — The Farrell Law Firm, P.C.

(57) ABSTRACT

An electronic device according to various embodiments of the present invention comprises: a first port and a second port; a system; a battery; a first charging circuit electrically connected to the first port, the system, and the battery; and a second charging circuit electrically connected to the second port, the system, the battery, and the first charging circuit. Accordingly, the electronic device can be supplied with electricity from a plurality of electric supplies through circuits which are realized in a simple manner.

15 Claims, 16 Drawing Sheets

(51) Int. Cl.
*H02J 7/02* (2016.01)
*H02J 7/35* (2006.01)

(52) U.S. Cl.
CPC ......... *H02J 7/0045* (2013.01); *H02J 7/00304* (2020.01); *H02J 7/025* (2013.01); *H02J 7/35* (2013.01)

(56) References Cited

U.S. PATENT DOCUMENTS

| | | | |
|---|---|---|---|
| 2014/0103862 A1 | 4/2014 | Ahn et al. | |
| 2015/0280457 A1* | 10/2015 | Jung | H02J 7/00047 320/106 |
| 2016/0241066 A1* | 8/2016 | Kim | H02J 7/0027 |
| 2016/0352101 A1 | 12/2016 | Koo | |

FOREIGN PATENT DOCUMENTS

| | | |
|---|---|---|
| KR | 1020150031565 | 3/2015 |
| KR | 1020150073194 | 6/2015 |
| KR | 1020150112717 | 10/2015 |
| KR | 1020160140275 | 12/2016 |

\* cited by examiner

ELECTRONIC DEVICE FOR CONTROLLING POWER

PRIORITY

This application is a National Phase Entry of International Application No. PCT/KR2017/010812, which was filed on Sep. 28, 2017, and claims priority to Korean Patent Application No. 10-2016-0124946, which was filed on Sep. 28, 2016, the content of each of which is incorporated herein by reference.

FIELD

Various embodiments of the disclosure relate to an electronic device for controlling power.

DESCRIPTION OF RELATED ART

By virtue of the remarkable growth of information communication technologies, semiconductor technologies, etc., a supply and use of various electronic devices are being suddenly increased. As the electronic devices are supplied widely, the electronic devices are supporting various functions in association with other electronic devices.

To support various functions, the electronic devices need more power. Accordingly to this, a technology for supplying more power to the electronic devices is being developed. For example, a USB 3.1 type-C standard interface (below, a USB type-C interface) possible to supply power of 100 watts (W), and a high-speed battery charging technology for supplying more power to the electronic devices in a short period of time are being deployed.

Also, the electronic device receives a supply of power from a power supply (example: a travel adaptor) through a plurality of ports (or interfaces), or transmits power to an on the go (OTG) device connected to the electronic device.

In the conventional art, in case where a plurality of electric supplies are connected to a plurality of ports, an electronic device can receive a supply of power from one power supply among the plurality of electric supplies, and cannot receive a supply of power from the plurality of electric supplies at the same time.

Various embodiments of the disclosure relate to an apparatus for controlling power capable of receiving a supply of power from a plurality of electric supplies at the same time, and an electronic device including the same.

Technological solutions the disclosure seeks to achieve are not limited to the above-mentioned technological solutions, and other technological solutions not mentioned above would be able to be clearly understood by a person having ordinary skill in the art from the following statement.

SUMMARY

An electronic device according to various embodiments of the disclosure may include a first port and a second port, a system, a battery, a first charging circuit electrically coupled with the first port, the system, and the battery, and a second charging circuit electrically coupled with the second port, the system, the battery, and the first charging circuit.

An apparatus for controlling power according to various embodiments of the disclosure and an electronic device including the same may receive a supply of power at the same time from a plurality of electric supplies through a simply implemented circuit. For example, in response to an power supply being coupled to each of one construction (example: a monitor) and the other construction (example: a keyboard) in a 2-in-1 PC, in response to a mobile terminal being put on a wireless charger pad in a state in which a travel adaptor is coupled to the mobile terminal in the mobile terminal, or in response to a DC jack and a USB plug being coupled to a notebook, etc., the electronic device can receive a supply of power from the plurality of electric supplies coupled.

DETAILED DESCRIPTION

Figure 1:
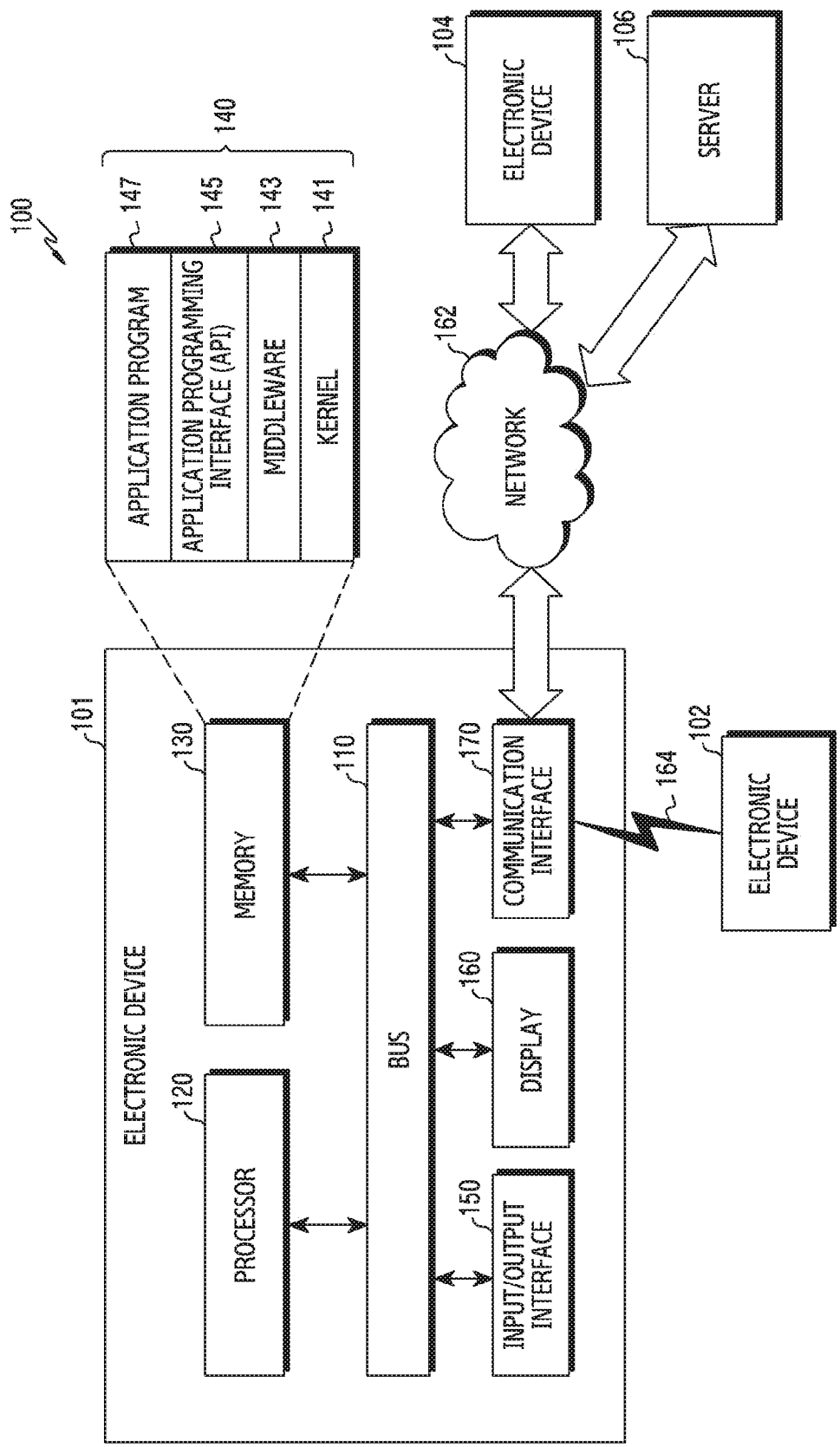
FIG. 1 illustrates an environment of a network including an electronic device according to various embodiments of the disclosure.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements. Singular forms may include plural forms as well unless the context clearly indicates otherwise. In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B. The expression "a first", "a second", "the first", or "the second" used in various embodiments of the present disclosure may modify various components regardless of the order and/or the importance but does not limit the corresponding components. It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer to a situation in which the device, together with other devices or components, "is able to". For example, the phrase "processor adapted (or configured) to perform A, B, and C" may refer to a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto. According to some example embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices. As used herein, the term "user" may indicate a person who uses an electronic device or a device (e.g., an artificial intelligence electronic device) that uses an electronic device.

Referring to FIG. 1, an electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output interface circuitry) 150, a display 160, and a communication interface (e.g., including communication circuitry) 170. In some embodiments, the electronic device 101 may omit at least one of the above elements or may further include other elements. The bus 110 may include, for example, a circuit for connecting the elements 110-170 and transferring communication (e.g., control messages and/or data) between the elements. The processor 120 may include various processing circuitry, such as, for example, and without limitation, one or more of a dedicated processor, a Central Processing Unit (CPU), an Application Processor (AP), and a Communication Processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data. In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program. The API 145 is an interface through which the applications 147 control functions provided from the kernel 141 or the middleware 143, and may include, for example, at least one interface or function (e.g., instruction) for file control, window control, image processing, or text control. The input/output interface 150, for example, may include various input/output circuitry and may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display, or the like, but is not limited thereto. The display 160, for example, may display various types of content (e.g., text, images, videos, icons, or symbols) for the user. The display 160 may include a touch screen and receive, for example, a touch, gesture, proximity, or hovering input using an electronic pen or the user's body part.

The communication interface 170, for example, may include various communication circuitry and may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication 164. The short-range communication 164 may be performed by using at least one of, for example, Wi-Fi, Bluetooth, Bluetooth low energy (BLE), Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic apparatuses 102 and 104 may be of a type identical to or different from that of the electronic apparatus 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic apparatus may execute the requested functions or the additional functions, and may deliver a result of the execution to the electronic apparatus 101. The electronic device 101 may process the received result as it is or additionally to provide the requested functions or services. To achieve this, for example, cloud computing, distributed computing, or client-server computing technology may be used.

Figure 2:
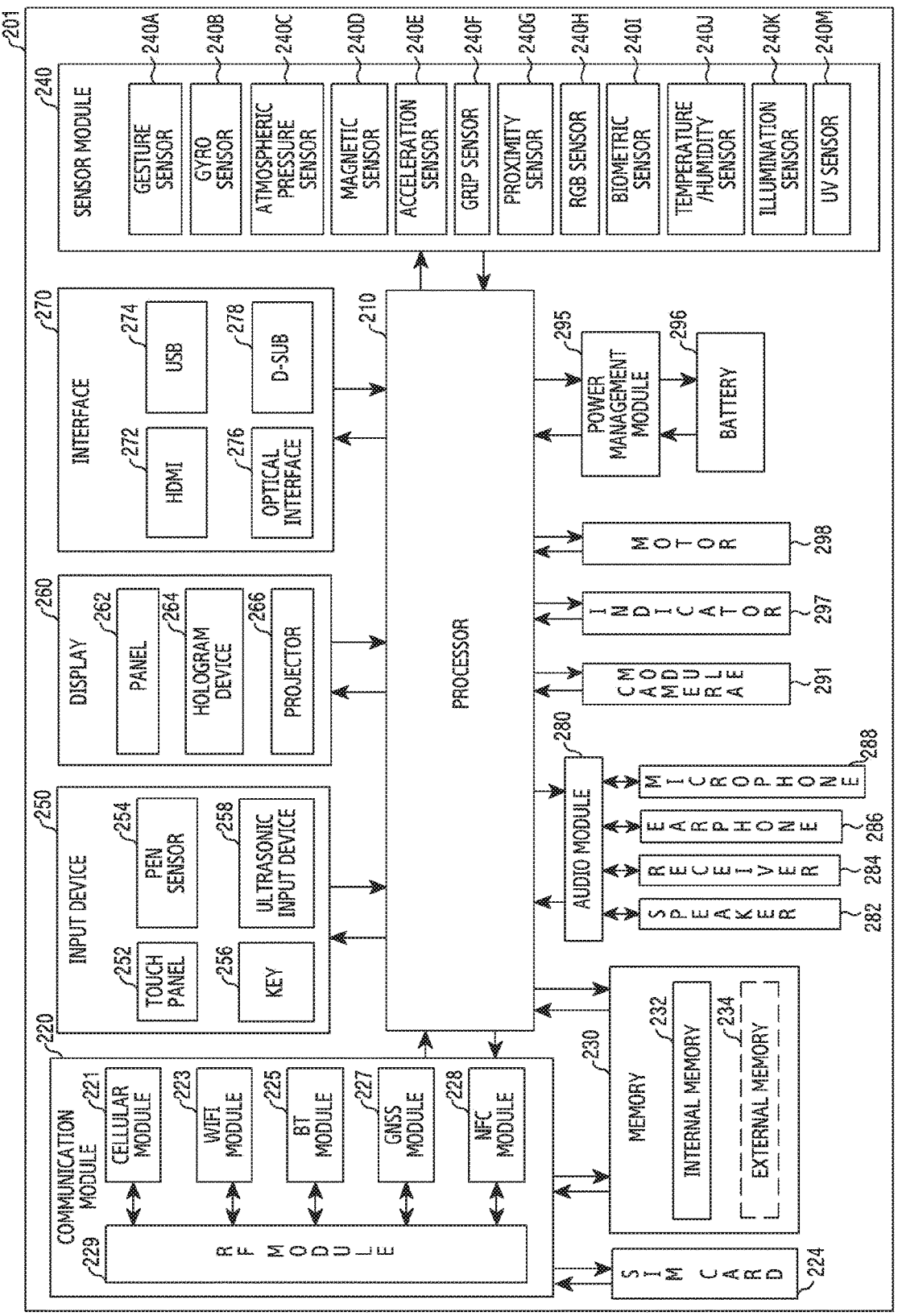
FIG. 2 illustrates a block diagram of an electronic device according to various embodiments of the disclosure.

FIG. 2 is a block diagram illustrating an example electronic device according to various example embodiments of the present disclosure. For example, the electronic apparatus 201 may include the whole or part of the electronic apparatus 101 illustrated in FIG. 1. The electronic device 201 may include at least one processor (e.g., Application Processor (AP)) (e.g., including processing circuitry) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include various communication circuitry, such as, for example, and without limitation, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229. The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP). Each of the Wi-Fi module 223, the BT module 225, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package. The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna.

According to another example embodiment of the present disclosure, at least one of the cellular module 221, the Wi-Fi module 223, the BT module 225, the GNSS module 227, and the NFC module 228 may transmit and receive RF signals through a separate RF module. The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 and/or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like). The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic apparatus 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor (e.g., a biometric sensor) 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic apparatus 201 may further include a processor configured to control the sensor module 240 as a part of or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user. The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (for example, a microphone 288) and identify data corresponding to the detected ultrasonic waves.

The display 260 (for example, the display 160) may include a panel 262, a hologram device 264 or a projector 266. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside the electronic apparatus 201. According to an embodiment, the display 260 may further include a control circuit for controlling the panel 262, the hologram device 264, or the projector 266. The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like. The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp). The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic apparatus 201 or a part (e.g., the processor 210). The motor 298 may convert an electrical signal into mechanical vibration, and may generate vibration, a haptic effect, or the like. Although not illustrated, the electronic apparatus 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™. Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
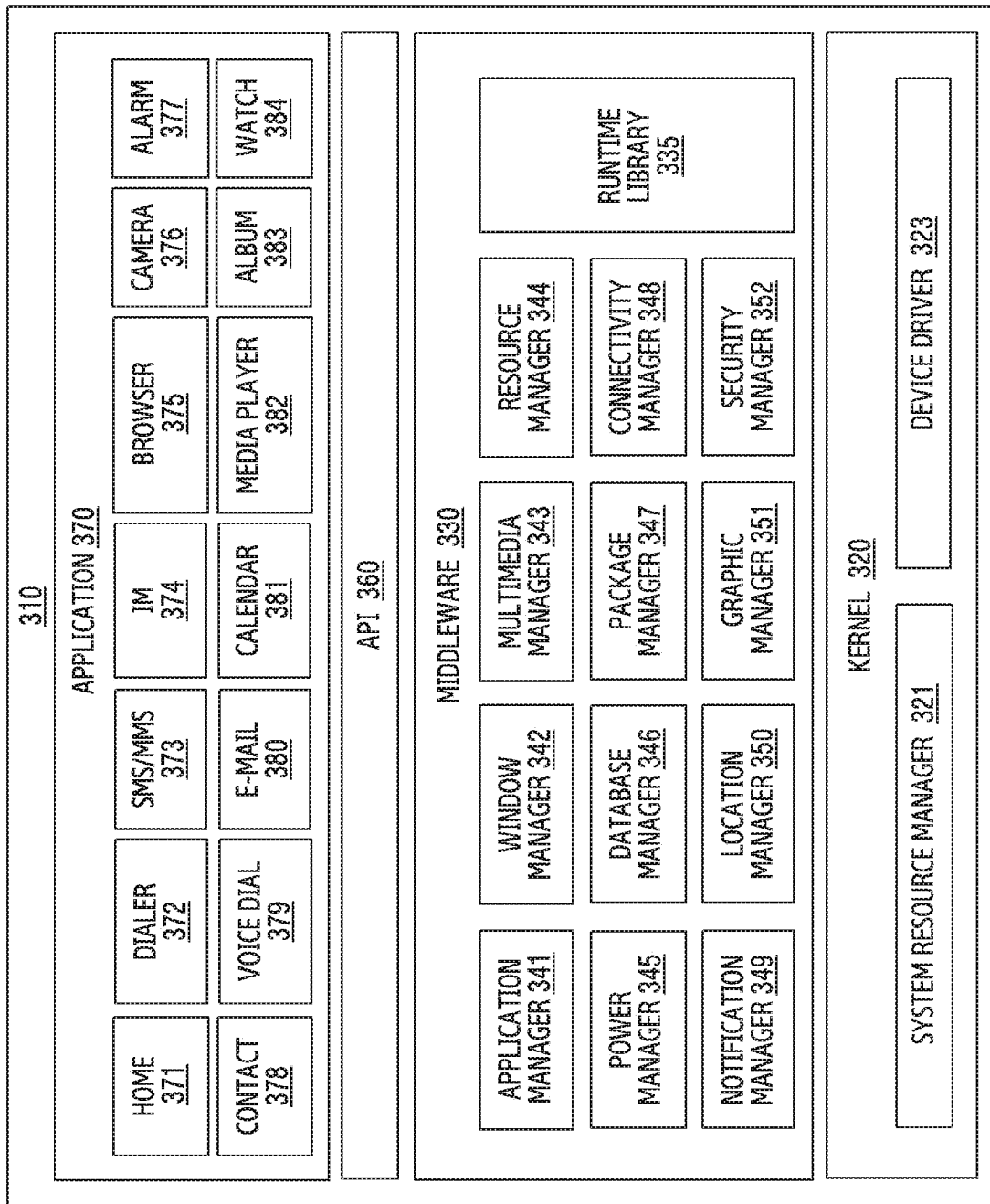
FIG. 3 is a block diagram of a program module according to various embodiments.

FIG. 3 is a block diagram illustrating an example program module according to various example embodiments. According to an example embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like. The program module 310 may include a kernel 320, middleware 330, an API 360, and/or an application 370. At least some of the program module 310 may be preloaded on the electronic apparatus, or may be downloaded from an external electronic apparatus (e.g., the electronic apparatus 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an example embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide a function required by the applications 370 in common or provide various functions to the applications 370 through the API 360 so that the applications 370 can efficiently use limited system resources within the electronic device. According to an example embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like. The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370. The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like. According to an example embodiment of the present disclosure, when the electronic apparatus (e.g., the electronic apparatus 101) has a telephone call function, the middleware 330 may further include a telephony manager for managing a voice call function or a video call function of the electronic apparatus. The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements. The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information). According to an example embodiment of the present disclosure, the applications 370 may include an application (hereinafter, referred to as an "information exchange application" for convenience of description) supporting information exchange between the electronic apparatus (e.g., the electronic apparatus 101) and an external electronic apparatus (e.g., the electronic apparatus 102 or 104). The application associated with information exchange may include, for example, a notification relay application for forwarding specific information to an external electronic device, or a device management application for managing an external electronic device. For example, the notification relay application may include a function of delivering, to the external electronic apparatus (e.g., the electronic apparatus 102 or 104), notification information generated by other applications (e.g., an SMS/MMS application, an email application, a health care application, an environmental information application, etc.) of the electronic apparatus 101. Further, the notification relay application may receive notification information from, for example, an external electronic device and provide the received notification information to a user. The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service). According to an example embodiment, the applications 370 may include applications (for example, a health care application of a mobile medical appliance or the like) designated according to attributes of the external electronic device 102 or 104. According to various example embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module' may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various example embodiments, at least part of a device (e.g. modules or functions thereof) or a method is embodied as commands which are stored in a computer-readable recording medium (e.g. memory (130)) in a form of a program module. If the commands are executed by a processor (e.g. processor (120)), the processor performs functions corresponding to the commands. The computer-readable recording medium includes a hard disc, a floppy disc, magnetic medium (e.g. magnetic tape), an optical reading medium (for example, a compact disc-ROM (CD-ROM), a digital versatile disc (DVD), magnetic optic medium (e.g. floptical disk), internal memory, etc. Commands include codes that are generated by complier or executable by interpreter. The module or the program module, according to various example embodiments, may: include one or more elements described above; exclude some of them; or further include other elements. The operations performed by the module, the program module, or other elements, according to various example embodiments, may be executed in a sequential, parallel, iterative, or heuristic method. In addition, some operations may be executed in a different order, or may be omitted, or other operations may be added.

Figure 4:
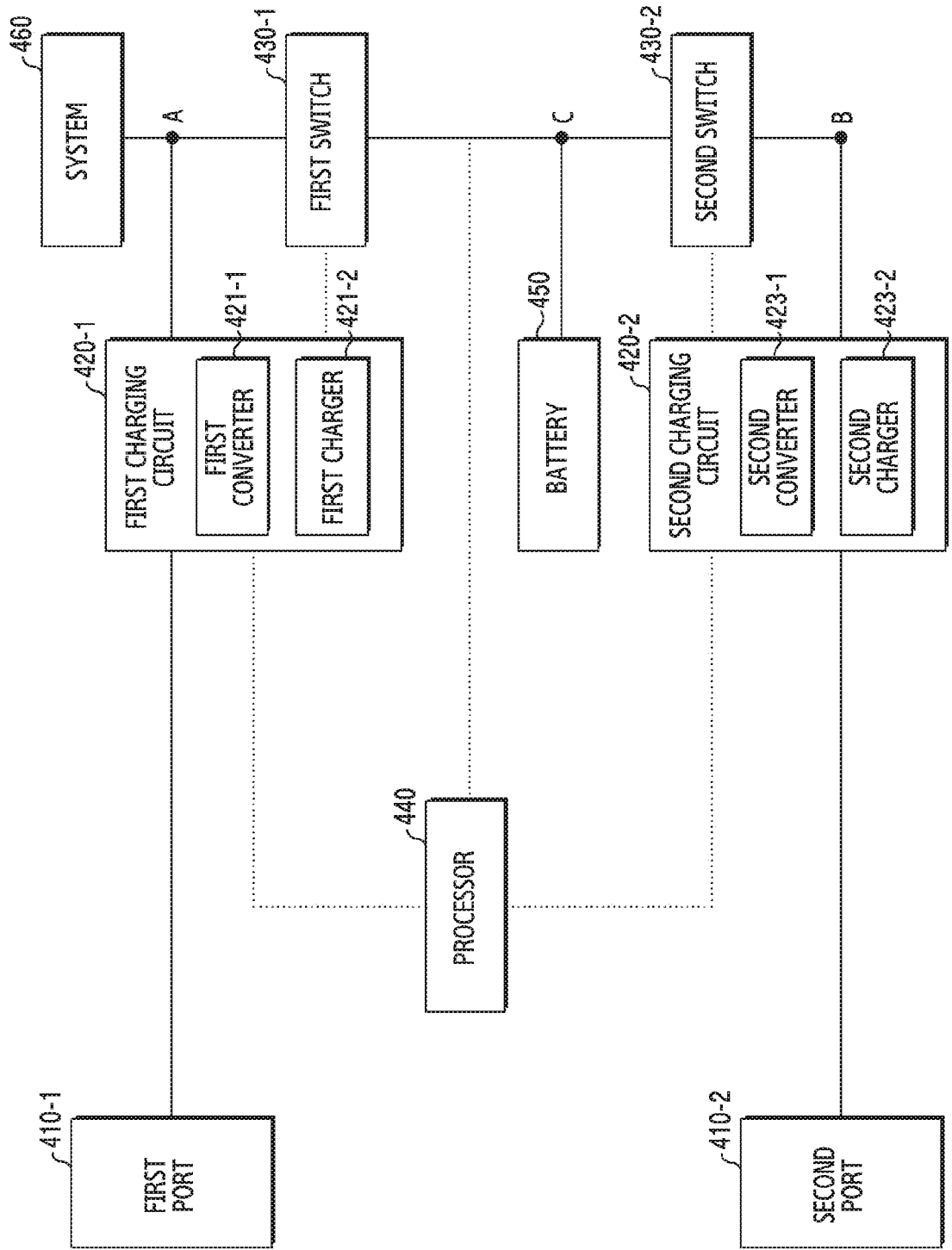
FIG. 4 is a block diagram of an electronic device according to an embodiment of the present invention.

FIG. 4 is a block diagram of an electronic device 101 for controlling power according to an embodiment of the disclosure.

Referring to FIG. 4, the electronic device 101 may include a first port 410-1, a second port 410-2, a first charging circuit 420-1, a second charging circuit 420-2, a first switch 430-1 and a second switch 430-2, a processor 440, a battery 450, and a system 460, etc.

In an embodiment, in response to an external device being coupled to the first port 410-1, the first port 410-1 (or a first interface, or a first input/output device, etc.) may forward power supplied from the external device to within the electronic device 101. For example, in response to a power supply (or a source device) (example: a travel adaptor) being coupled to the first port 410-1, the first port 410-1 may forward power supplied from the power supply, to the battery 450. In another embodiment, in response to an on the go (OTG) device (or a sink device) being coupled to the first port 410-1, the first port 410-1 may forward power supplied from the battery 450 to the OTG device. However, it is not limited to this.

In an embodiment, in response to an external device being coupled to the second port 410-2, the second port 410-2 may forward power supplied from the external device to within the electronic device 101. For example, in response to a power supply (example: a high-speed battery charger) being coupled to the second port 410-2, the second port 410-2 may forward power supplied from the power supply to the battery 450. In another embodiment, in response to an on the go (OTG)) device (or a sink device) being coupled to the second port 410-2, the first port 410-2 may forward power supplied from the battery 450 to the OTG device. However, it is not limited to this.

In an embodiment, the first port 410-1 and the second port 410-2 may receive a supply of power from various electric supplies. For example, the first port 410-1 and the second port 410-2 may receive a supply of power from a portable charger, a high-speed battery charger, a wireless charger, or a solar charger, etc. However, a power supply from which the first port 410-1 and the second port 410-2 may receive a supply of power is not limited to this.

In an embodiment, the first port 410-1 and the second port 410-2 may be implemented in various forms according to a standard (example: a universal serial bus (USB) type-C, etc.)

capable of transmitting/receiving power or data that the electronic device 101 may support. In an embodiment, although not illustrated in FIG. 4, in response to an external device being coupled to at least one of the first port 410-1 and the second port 410-2, the port coupled with the external device may forward information about the coupled external device to the processor 440. However, it is not limited to this.

In an embodiment, the first port 410-1 and the second port 410-2 may forward (or one-way power transmission) power in a direction going from an external device to the electronic device 101. In another embodiment, the first port 410-1 and the second port 410-2 may forward (or two-way power transmission) power in a direction going from the external device to the electronic device 101 or a direction going from the electronic device 101 to the external device.

In an embodiment, FIG. 4 exemplifies, though not limited to, the first port 410-1 and the second port 410-2, and the electronic device 101 may include three ports or more as well.

In an embodiment, the first charging circuit 420-1 may be electrically coupled with the first port 410-1, the system 460, the battery 450, and the second charging circuit 420-2. The first charging circuit 420-1 may forward power to at least one of the first port 410-1, the system 460, the battery 450, and an external device coupled to the second port 410-2. For example, in response to a power supply being coupled to the first port 410-1, the first charging circuit 420-1 may forward power inputted from the first port 410-1 to at least one of the system 460 and the battery 450. In another example, in response to a power supply being coupled to the first port 410-1 and an OTG device being coupled to the second port 410-2, the first charging circuit 420-1 may forward power inputted from the first port 410-1 to at least one of the system 460, the battery 450, and the OTG device coupled to the second port 410-2. In a further example, in response to an OTG device being coupled to the first port 410-1, the first charging circuit 420-1 may forward power inputted from at least one of the battery 450 and a power supply coupled to the second port 410-1, to the first port 410-1. However, it is not limited to this.

In an embodiment, in response to a voltage being inputted to the first charging circuit 420-1, the first charging circuit 420-1 may adjust a magnitude of the inputted voltage on the basis of at least one of information of the electronic device 101 and information of an external device coupled to the electronic device 101, and output a voltage having the adjusted magnitude. For example, in response to a power supply being coupled to the first port 410-1, the first charging circuit 420-1 may reduce (example: a buck function) or boost (example: a boost function) the inputted voltage at least partially on the basis of a charge state of the battery 450 and output, or output the same voltage (a buck boost function) as the inputted voltage. For example, in response to a power supply being coupled to the first port 410-1 and the battery 450 not being in a full charge state, the first charging circuit 420-1 may output a voltage having the same magnitude as a voltage (or a voltage at battery 450 full charging) that the battery 450 outputs at battery 450 full charging. However, it is not limited to this. For example, in response to the battery 450 being fully discharged, the first charging circuit 420-1 may increase a magnitude of an output voltage gradually until an output voltage of the battery 450 becomes a designated voltage from a voltage of a fully discharged state. However, it is not limited to this.

In an embodiment, the first charging circuit 420-1 may include a first converter 421-1 and a first charger 421-2, etc.

In an embodiment, the first converter 421-1 may include a buck boost converter. The buck boost converter may reduce or boost an input voltage under the control of the first charger 421-2, or output the same voltage as the input voltage. In an embodiment, the buck boost converter may be comprised of a plurality of switches and at least one element for storing power. In an embodiment, the plurality of switches may be comprised of field effect transistors (FETs), bipolar junction transistors (BJTs), diodes, or a combination thereof, and the element for storing power may be comprised of an inductor or a capacitor, etc. However, it is not limited to this.

In an embodiment, the first charger 421-2 may control on/off of the switches included in the first converter 421-1, and the first switch 430-1. For example, the first charger 421-2 may obtain a charge state of the battery 450 and, at least partially on the basis of the obtained charge state of the battery 450, control the first converter 421-1 wherein the first converter 421-1 outputs a voltage having the same magnitude as a voltage that the battery 450 outputs at battery 450 full charging. In another example, in response to the processor 440 obtaining the charge state of the battery 450, the first charger 421-2 may receive a control signal from the processor 440, thereby controlling the first converter 421-1 wherein the first converter 421-1 outputs a voltage having the same magnitude as a voltage that the battery 450 outputs at battery 450 full charging. However, it is not limited to this. In a further example, in response to a power supply being coupled to the first port 410-1 in a state in which the battery 450 is fully charged, the first charger 421-2 may turn off the first switch 430-1 wherein the first charger 421-2 supplies power inputted from the power supply to the system 460 and cuts off power supplied from the battery 450 to the system 460. However, it is not limited to this. In an embodiment, the first charger 421-2 may be denoted diversely like a charging circuit control unit, etc.

In an embodiment, the second charging circuit 420-2 may be electrically coupled with the second port 410-2, the system 460, the battery 450, and the first charging circuit 420-1. The second charging circuit 420-2 may forward power to the second port 410-2, the system 460, the battery 450, and an external device coupled to the first port 410-1. The second charging circuit 420-2 may include a second converter 423-1 and a second charger 423-3. A construction and function, etc. of the second charging circuit 420-2 are at least partially the same or similar with a construction and function of the first charging circuit 420-1 and thus a detailed description is omitted.

In an embodiment, the second charging circuit 420-2 may output the same voltage as the first charging circuit 420-1. For example, in response to a power supply being coupled to the second port 410-2 and the battery 450 not being in a full charge state, the second charging circuit 420-2 may, identically or similarly with the first charging circuit 420-1, output a voltage having the same magnitude as a voltage that the battery 450 outputs at battery 450 full charging. For example, in response to a power supply being coupled to each of the first port 410-1 and the second port 410-2, an output voltage of the first charging circuit 420-1 and an output voltage of the second charging circuit 420-2 may be the same as each other. For example, in response to the power supply being coupled to each of the first port 410-1 and the second port 410-2, the first charging circuit 420-1 and the second charging circuit 420-2 may output voltages wherein a voltage of an A point (or a voltage of a terminal of the first charging circuit 420-1 electrically coupled with the battery 450) and a voltage of a C point (or a voltage of a terminal of the second charging circuit 420-2 electrically coupled with the battery) have the same magnitude within an error range.

In an embodiment, in a state in which an power supply being coupled to each of the first port 410-1 and the second port 410-2, the first charging circuit 420-1 and the second charging circuit 420-2 output voltages of the same magnitude, whereby power inputted from the first port 410-1 and the second port 410-2 may be summed up at the C point and be forwarded to the battery 450. In an embodiment, in response to a power supply being coupled to each of the first port 410-1 and the second port 410-2 and the battery 450 not being in a full charge state, the first charging circuit 420-1 and the second charging circuit 420-2 may output voltages having magnitudes higher than a magnitude of a current output voltage of the battery 450 and supply the outputted voltages to the battery 450, thereby preventing a problem (example: a shut-down of the electronic device 101, a circuit damage of the electronic device 101 or an external device, etc.) that is caused by forwarding power supplied from the first port 410-1 to the power supply coupled to the second port 410-2 or forwarding power supplied from the second port 410-2 to the power supply coupled to the first port 410-1.

For example, in response to a power supply being coupled to each of the first port 410-1 and the second port 410-2 and a current voltage of the battery 450 of outputting 8.7 volts (V) at full charging being 8.2V, in response to the first charging circuit 420-1 outputting 8.7V and the second charging circuit 420-2 outputting 8.6V corresponding to within an error range of 8.7V, power supplied from the first port 410-1 and power supplied from the second port 410-2 may be summed up at a B point and be all supplied to the battery 450. In an embodiment, the battery 450 of the electronic device 101 may receive a supply of power at the same time from the electric supplies coupled to the first port 410-1 and the second port 410-2, to perform a charge operation.

In an embodiment, the first switch 430-1 may be electrically coupled with the first charging circuit 420-1, the system 460, the battery 450, and the second switch 430-2.

In an embodiment, the first switch 430-1 may be turned on under the control of the first charging circuit 420-1 (example: the first charger 421-2), thereby forwarding power inputted from the first port 410-1 to the battery 450. In another embodiment, the first switch 430-1 may be turned on under the control of the first charging circuit 420-1, thereby forwarding power from the battery 450 to the system 460 or an OTG device coupled to the first port 410-1. In a further embodiment, in response to a power supply being coupled to the first port 410-1 and the battery 450 being in a full charge state, the first switch 430-1 may be turned off under the control of the first charging circuit 420-1. In an embodiment, the turn-on or turn-off operation of the first switch 430-1 may be controlled by the processor 440 as well. For example, the processor 440 may forward a control signal for the turn-on or turn-off operation of the first switch 430-1 to the first charging circuit 420-1 in consideration of a charge state of the battery 450 and a required power of the system 460, etc. The first charging circuit 420-1 may forward a signal for turning on or turning off the first switch 430-1 to the first switch 430-1 on the basis of the control signal for the turn-on or turn-off operation of the first switch 430-1 received from the processor 440. However, it is not limited to this.

In an embodiment, the second switch 430-2 may be electrically coupled with the second charging circuit 420-2, the battery 450, and the first switch 430-1.

In an embodiment, an operation of the second switch 430-2 is at least partially the same or similar with the operation of the first switch 430-1 and thus a detailed description is omitted.

In an embodiment, in response to the second switch 430-2 and the first switch 430-1 being turned on, power supplied from at least one of the battery 450 and a power supply coupled to the second port 410-2 may be forwarded to the system 460.

In an embodiment, the first switch 430-1 and the second switch 430-2 may consist of field effect transistors (FETs), bipolar junction transistors (BJTs), diodes, or a combination thereof. However, it is not limited to this.

In an embodiment, the processor 440 may control an operation of supplying power to the electronic device 101 or supplying from the electronic device 101 to an external device. In an embodiment, the processor 440 may detect that the external device is coupled to at least one of the first port 410-1 and the second port 410-2. In another embodiment, in response to the external device being coupled to the first port 410-1 and the second port 410-2, the processor 440 may identify the kind of the external device at least partially on the basis of information received from the external device. However, it is not limited to this.

In an embodiment, the processor 440 may control at least one of the first charging circuit 420-1 and the second charging circuit 420-2. For example, the processor 440 may control at least one of the first charging circuit 420-1 and the second charging circuit 420-2 at least partially on the basis of power that an external device (example: a power supply) is possible to supply, power required by the system 460, power required by the external device (example: an OTG device, etc.), or a state of the battery 450 (example: a charge state of the battery 450), etc. For example, the processor 440 may identify a magnitude and direction of a voltage and current that at least one of the first charging circuit 420-1 and the second charging circuit 420-2 will output, at least partially on the basis of the power that the external device (example: the power supply) is possible to supply, the power required by the system 460, the power required by the external device (example: the OTG device, etc.), or the state of the battery 450 (example: the charge state of the battery 450), etc. The processor 440 may forward a signal including information about the magnitude and direction of the voltage and current that at least one of the first charging circuit 420-1 and the second charging circuit 420-2 will output, to at least one of the first charging circuit 420-1 and the second charging circuit 420-2. However, it is not limited to this.

In an embodiment, the processor 440 may control at least one of the first switch 430-1 and the second switch 430-2. For example, the processor 440 may transmit, to at least one of the first charging circuit 420-1 and the second charging circuit 420-2, a signal for controlling at least one of the first switch 430-1 and the second switch 430-2, at least partially on the basis of power that an external device (example: a power supply) is possible to supply, power required by the system 460, power required by an external device (example: an OTG device, etc.), or a state of the battery 450 (example: a charge state of the battery 450), etc. However, it is not limited to this.

In an embodiment, the processor 440 may be a construction being the same as that of the processor 120 of FIG. 1 or being included in the processor 120. In another embodiment, the processor 440, which is a construction independent from the processor 120 of FIG. 1, may be a construction for controlling power transmitted/received to/from the electronic device 101. In an embodiment, the processor 440 may include a micom, or an embedded controller. In another embodiment, in response to the electronic device 101 supporting a USB type-C standard, the processor 440 may include a USB controller (or a port controller, or a channel configuration (CC) controller, etc.). However, it is not limited to this.

In an embodiment, the system 460 may include each construction of the electronic device 101. For example, the system 460 may include constructions consuming power for driving, such as the display 260, the communication module 220, or the sensor module 240, etc. However, it is not limited to this.

In an embodiment, the system 460 may be electrically coupled with the first charging circuit 420-1 and the first switch 430-1. However, it is not limited to this. For example, the system 460 may be coupled with a terminal of the first charging circuit 420-1, and be coupled with the second charging circuit 420-2 through the first switch 430-1 and the second switch 430-2. In an embodiment, the system 460 is coupled to the first charging circuit 420-1, whereby the system 460 may receive a supply of power from a power supply coupled to at least one of the first port 410-1 and the second port 410-2 even at battery 450 full charging. In another embodiment, in response to the system 460 being coupled to the first charging circuit 420-1, thereby being capable of receiving a supply of power from the battery 450 and a power supply coupled to at least one of the first port 410-1 and the second port 410-2, the system 460 may receive a supply of power, prior to the battery 450, from the power supply coupled to at least one of the first port 410-1 and the second port 410-2. In a further embodiment, the system 460 may be coupled to the first charging circuit 420-1, thereby protecting the battery 450. For example, in response to the system 460 being directly coupled with the battery 450 (example: the system being coupled to the B point), for example, a degree of change of a charging current in a constant voltage (CV) charging interval may increase according to a load of the system 460, and the battery 450 may be overheated or stressed, thereby causing a problem fatal to the battery 450, and the system 460 may be coupled to the first charging circuit 420-1, thereby preventing this problem.

In an embodiment, the battery 450 may supply power to at least one of the system 460, the first port 410-1 and the second port 410-2. In an embodiment, the battery 450 may be electrically coupled with the system 460, the first charging circuit 420-1, and the second charging circuit 420-2. However, it is not limited to this. In an embodiment, in response to a power supply being coupled to each of the first port 410-1 and the second port 410-2, the battery 450 may receive a supply of power from the electric supplies coupled to the first port 410-1 and the second port 410-2.

FIG. 4 exemplifies that the electronic device 101 includes the first port 410-1 and the second port 410-2, the first charging circuit 420-1 and the second charging circuit 420-2, the first switch 430-1 and the second switch 430-2, but the electronic device 101 may include three ports or more, charging circuits corresponding to the three ports or more, and switches. For example, the electronic device 101 may include charging circuits of a number corresponding to the number of ports. In an embodiment, in response to the electronic device 101 including three ports or more and electric supplies being coupled to two ports or more, output terminals of charging circuits corresponding to the two ports or more may identically output voltages, thereby stably supplying power from the electric supplies coupled to the two ports or more to the battery 450. In an embodiment, each of a plurality of ports and each of a plurality of charging circuits corresponding to the plurality of ports may be coupled through one track (or a line, or a path). Through one track coupling each of the plurality of ports and each of the plurality of charging circuits corresponding to the plurality of ports, power may be supplied from an external device to the electronic device 101 or power be supplied from the electronic device 101 to the external device. Through this, the electronic device 101 may be implemented using less constituent elements compared to the conventional art.

Figure 5:
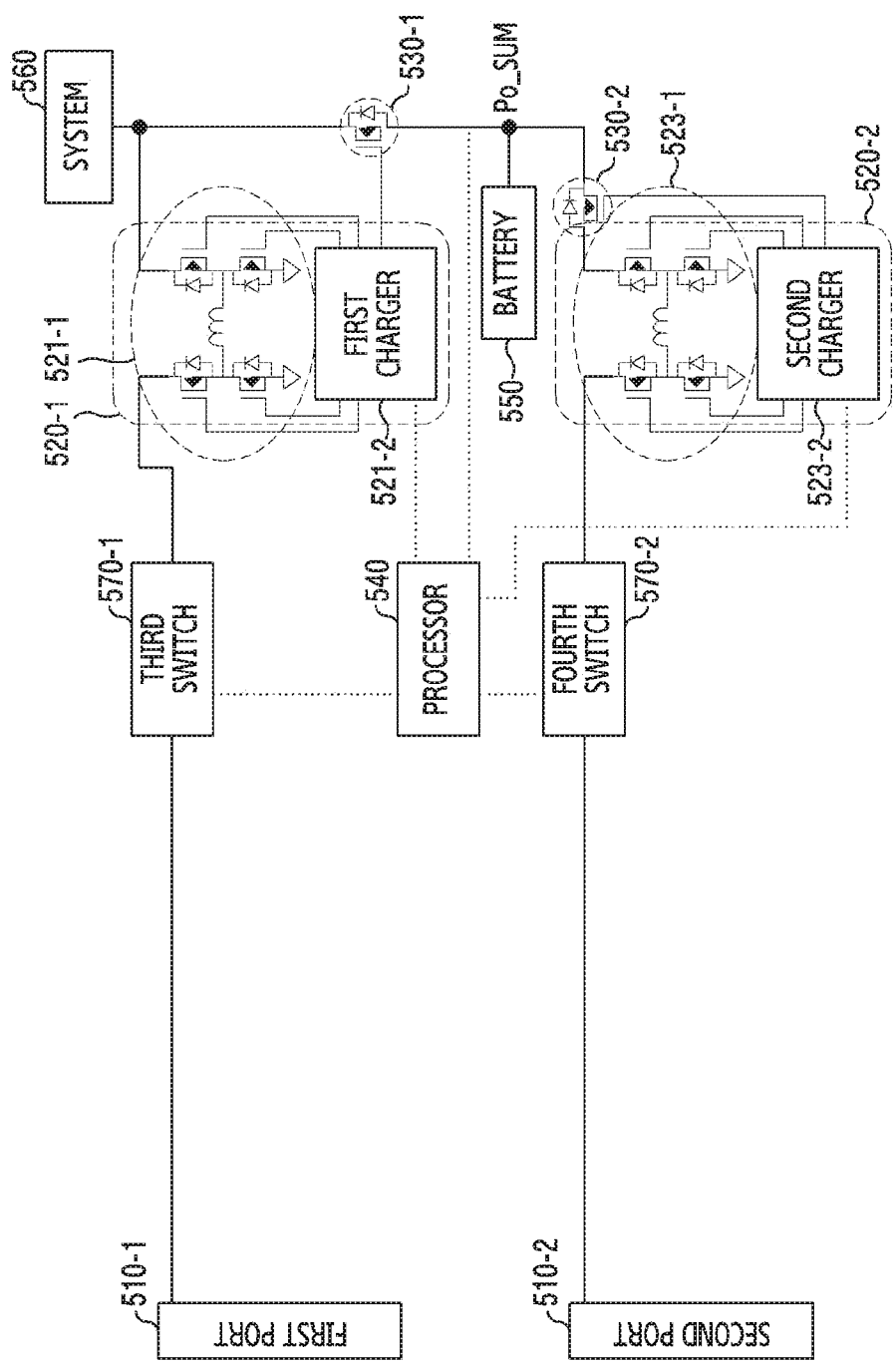
FIG. 5 is an example diagram of an electronic device for controlling power according to an embodiment of the disclosure.

FIG. 5 is an example diagram of an electronic device for controlling power according to an embodiment of the disclosure.

Referring to FIG. 5, the electronic device 101 may include a first port 510-1, a second port 510-2, a first charging circuit 520-1, a second charging circuit 520-2, a first switch 530-1 and a second switch 530-2, a processor 540, a battery 550, a system 560, and a third switch 570-1 and a fourth switch 570-2, etc.

In an embodiment, the first port 510-1 and the second port 510-2 are at least partially the same or similar with the first port 410-1 and the second port 410-2 of FIG. 4 and thus a detailed description is omitted.

In an embodiment, the first charging circuit 520-1 is at least partially the same or similar with the first charging circuit 420-1 of FIG. 4 and thus a repeated description is omitted.

In an embodiment, the first charging circuit 520-1 may be electrically coupled with the third switch 570-1, the system 560, the battery 550, and the second charging circuit 520-2. In an embodiment, the first charging circuit 520-1 may include a first converter 521-1 and a first charger 521-2, etc.

In an embodiment, the first converter 521-1 may include a buck boost converter. For example, as illustrated in FIG. 5, the first converter 521-1 may include four n-channel metal oxide semiconductor field effect transistors (NMOS FETs) and an inductor. However, it is not limited to this. For example, the first converter 521-1 may be comprised of a FET, a bipolar junction transistor (BJT), a diode, etc. other than the NMOS FET, and a capacitor, etc. other than the inductor. In an embodiment, the first converter 521-1 may reduce or boost an input voltage under the control of the first charger 521-2, or output the same voltage as the input voltage. For example, at least some of four NMOS FETs included in the first converter 521-1 may be turned on or turned off by the first charger 521-2 (or a duty ratio is adjusted), thereby storing a current (or energy) in the inductor or outputting a current stored in the inductor, to thereby reduce or boost the input voltage or output the same voltage as the input voltage. However, it is not limited to this.

In an embodiment, the first charger 521-2 may control on/off of the four NMOS FETs included in the first converter 521-1 and the first switch 530-1. For example, the first charger 521-2 may obtain an output voltage of the battery 550. The first charger 521-2 may identify a charge state of the battery 550 at least partially on the basis of the obtained output voltage of the battery 550. The first charger 521-2 may control the first converter 521-1 wherein the first converter 521-1 outputs a voltage having the same magnitude as a voltage that the battery 550 outputs at battery 550 full charging at least partially on the basis of the obtained charge state of the battery 450. However, it is not limited to this.

In another example, in response to a power supply being coupled to the first port 510-1 in a state in which the battery 550 is fully charged, the first charger 521-2 may turn off the first switch 530-1 wherein the first charger 521-2 supplies power inputted from the power supply to the system 560. In response to the power supply being coupled to the first port 510-1 in a state in which the battery 550 is fully charged, and the first switch 530-1 being turned off, power supplying from the battery 550 to the system 560 may be cut off, and power may be supplied from the power supply coupled to the first port 510-1 to the system 560. However, it is not limited to this.

In an embodiment, the second charging circuit 520-2 is at least partially the same or similar with the second charging circuit 420-2 of FIG. 4 and thus a repeated description is omitted.

In an embodiment, the second charging circuit 520-2 may be electrically coupled with the fourth switch 570-2, the system 560, the battery 550, and the first charging circuit 520-1. The second charging circuit 520-2 may forward power to an external device coupled to the second port 510-2, the system 560, the battery 550, and the first port 510-1. The second charging circuit 520-2 may include a second converter 523-1 and a second charger 523-2.

In an embodiment, the second charging circuit 520-2 may output the same voltage as the first charging circuit 520-1. For example, in response to a power supply being coupled to the second port 510-2 and the battery 550 not being in a full charge state, the second charging circuit 520-2 may, identically or similarly with the first charging circuit 520-1, output a voltage having the same magnitude as a voltage that the battery 550 outputs at battery 550 full charging. For example, in response to the power supply being coupled to each of the first port 510-1 and the second port 510-2, an output voltage of the first charging circuit 520-1 and an output voltage of the second charging circuit 520-2 may be the same as each other.

In an embodiment, in a state in which a power supply being coupled to each of the first port 510-1 and the second port 510-2, the first charging circuit 520-1 and the second charging circuit 520-2 output voltages of the same magnitude, whereby power inputted from the first port 510-1 and the second port 510-2 may be summed up at a P$_O$_SUM point and be forwarded to the battery 550. In an embodiment, the P$_O$_SUM point may be a common output node (or reference) of the first charging circuit 520-1 and the second charging circuit 520-2 and the battery 550.

In an embodiment, in response to a power supply being coupled to each of the first port 510-1 and the second port 510-2 and the battery 550 not being in a full charge state, the first charging circuit 520-1 and the second charging circuit 520-2 may output voltages having magnitudes higher than a magnitude of a current output voltage of the battery 550 and supply the outputted voltages to the battery 550, thereby preventing a problem (example: a shut-down of the electronic device 101, a circuit damage of the electronic device 101 or an external device, etc.) that is caused by forwarding power supplied from the first port 510-1 to the power supply coupled to the second port 510-2 or forwarding power supplied from the second port 510-2 to the power supply coupled to the first port 510-1.

In an embodiment, the first switch 530-1 and the second switch 530-2 are at least partially the same or similar with the first switch 430-1 and the second switch 430-2 of FIG. 4 and thus a repeated description is omitted.

In an embodiment, FIG. 5 illustrates that the first switch 530-1 and the second switch 530-2 each include an NMOS FET, but it is not limited to this. For example, the first switch 530-1 and the second switch 530-2 may consist of a FET, a bipolar junction transistor (BJT), a diode, or a combination thereof, other than the NMOS FET. However, it is not limited to this.

In an embodiment, the first switch 530-1 and the second switch 530-2 consisting of the NMOS FET may include a body diode. In an embodiment, in response to power required by the system 560, etc. being instantaneously increased in a state in which the NMOS FET is turned off, the body diode of the NMOS FET may forward the required power to the system 560, etc. However, it is not limited to this.

In an embodiment, the processor 540 may control an operation of supplying power to the electronic device 101 or supplying power from the electronic device 101 to an external device. In an embodiment, the processor 540 is at least partially the same or similar with the processor 440 of FIG. 4 and thus a repeated description is omitted.

In an embodiment, the processor 540 may control operations of the third switch 570-1 and the fourth switch 570-2. For example, the processor 540 may control turn-on or turn-off operations of the third switch 570-1 and the fourth switch 570-2 wherein over-voltage or over-current is not suddenly (momentarily) generated in the first port 510-1 and the second port 510-2. For example, in response to an external device not being coupled to the first port 510-1 or the second port 510-2, the processor 540 may turn off the third switch 570-1 or the fourth switch 570-2. Through this, the third switch 570-1 and the fourth switch 570-2 may perform an over voltage protection (OVP) function or an over current protection (OCP) function. In another example, in response to the external device being coupled to the first port 510-1 or the second port 510-2, the processor 540 may detect the coupling of the external device with the first port 510-1 or the second port 510-2, and turn on the third switch 570-1 or the fourth switch 570-2. However, it is not limited to this.

In an embodiment, the battery 550 and the system 560 are at least partially the same or similar with the battery 450 and the system 460 of FIG. 4 and thus a detailed description is omitted.

In an embodiment, the third switch 570-1 and the fourth switch 570-2 may perform a turn-on or turn-off operation under the control of the processor 540. In an embodiment, the electronic device 101 may not include the third switch 570-1 and the forth switch 570-2. However, it is not limited to this.

Figure 6:
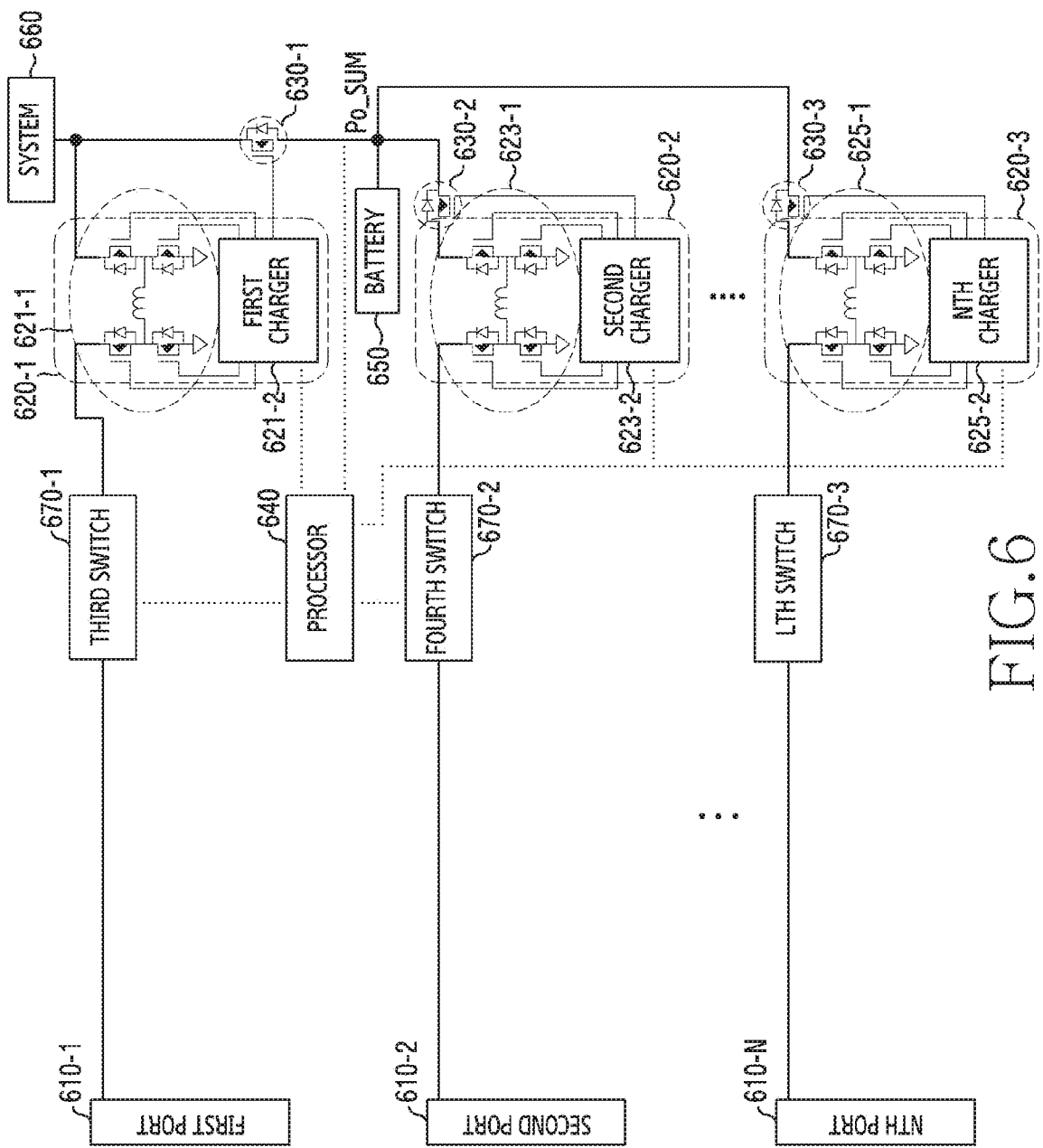
FIG. 6 is an example diagram of an electronic device for controlling power according to another embodiment of the disclosure.

FIG. 6 is an example diagram of an electronic device for controlling power according to another embodiment of the disclosure.

Referring to FIG. 6, the electronic device 101 may include an N number of ports, and an N number of charging circuits, etc. In an embodiment, N may be a number greater than 2. For example, the electronic device 101 may further include an N port 610-3, an Lth switch 670-3, an Nth charging circuit 620-3 including an Nth converter 625-1 and an Nth charger 625-2, and an Mth switch 630-3, etc.

In an embodiment, a description of the Nth port 610-3, the Lth switch 670-3, the Nth converter 625-1 and the Nth charger 625-2, etc. is the same or similar with at least part of FIG. 4 or FIG. 5 and thus a detailed description is omitted.

In an embodiment, the Nth charging circuit 620-3 may be electrically coupled with a battery 650, a system 660, and/or a first charging circuit 620-1 to an (N−1)th charging circuit (not shown). In an embodiment, the Nth charging circuit 620-3 may output the same voltage as output voltages of the first charging circuit 620-1 to the (N−1)th charging circuit. In an embodiment, in response to electric supplies being coupled to at least two ports among the first port 610-1 to the Nth port 610-N, power supplied from the coupled electric supplies may be summed up at a $P_O\_SUM$ point and be forwarded to the battery 650.

Figure 7:
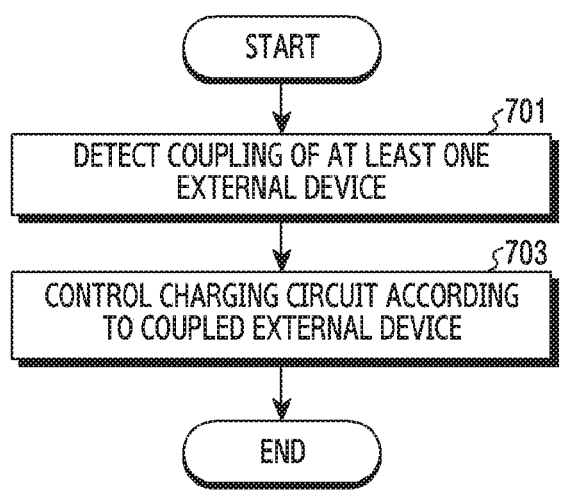
FIG. 7 is a flowchart explaining a method for controlling power according to various embodiments of the disclosure.

FIG. 7 is a flowchart explaining a method for controlling power according to various embodiments of the disclosure.

Referring to FIG. 7, in operation 701, the electronic device 101 may detect the coupling of at least one external device. For example, the electronic device 101 may detect that the external device is coupled to at least some of a plurality of ports. In an embodiment, the external device may include a power supply (or a source device) or an on the go (OTG) device (or a sink device), etc. For example, the power supply may be a travel adaptor capable of supplying power to the electronic device 101, a high-speed battery charger, a wireless charger, or a solar charger, etc. However, it is not limited to this. In another example, the OTG device may include a device needing power from the electronic device 101 like an accessory, etc. such as a USB memory, an earphone. However, it is not limited to this.

In an embodiment, the electronic device 101 may detect the coupling of an external device at least partially on the basis of information of a voltage value supplied from the external device through a port coupled with the external device, or an ID (or an impedance value) received from the external device, etc. In an embodiment, the electronic device 101 may detect the kind of the external device at least partially on the basis of the information, etc. received from the external device. For example, in response to an external device that supports a USB type-C standard being coupled to the electronic device 101, the electronic device 101 may detect the kind of the external device at least partially on the basis of channel configuration (CC) information, etc. received from the external device. However, a method for detecting the coupling of the external device or the kind of the external device is not limited to this.

In an embodiment, detecting of the coupling of the external device or the kind of the external device may be performed in a port controller or an embedded controller, etc., according to an interface standard that is supported by a port of the electronic device 101 or a port of the external device. However, it is not limited to this.

In operation 703, the electronic device 101 may control a charging circuit, etc. according to the coupled external device. For example, the electronic device 101 may control the charging circuit, etc. according to whether the coupled external device is a power supply or an OTG device.

In an embodiment, in response to the coupled external device being a power supply, the electronic device 101 may control a switch wherein the switch coupling a port to which the power supply is coupled and a charging circuit is turned on. In an embodiment, in response to the switch being turned on, a charger included in the charging circuit may be operated. For example, in response to the switch being turned on, the charger may be operated automatically. In another example, in response to the switch being turned on, the charger may be operated by the control of the processor. In an embodiment, in response to the charger being operated, the electronic device 101 may identify a battery charge state. For example, the charger may identify whether the battery is in a full charge state, or is in a non-full-charge state, etc. In another example, an embedded controller may identify the battery charge state as well. In an embodiment, the electronic device 101 may identify an output voltage and output current of a charging circuit (or a converter). For example, in response to a battery voltage not being in a full charge state, the electronic device 101 may control the charging circuit wherein the charging circuit outputs an output voltage of a battery full charge state. In an embodiment, the electronic device 101 may control the charging circuit wherein the charging circuit outputs a current that is based on power supplied from a power supply and an output voltage of the charging circuit. However, it is not limited to this. In an embodiment, in response to the coupled external device being the power supply, the electronic device 101 may supply power to the battery or the system. In another embodiment, in response to the power supply and the OTG device being coupled to a plurality of ports of the electronic device 101, the electronic device 101 may forward power supplied from the power supply to at least one of the battery, the system, and the OTG device.

In an embodiment, in response to an external device coupled to the port of the electronic device 101 being an OTG device, the electronic device 101 may forward power supplied from the battery or a power supply coupled to another port of the electronic device 101, to the OTG device.

In an embodiment, the electronic device 101 may receive information about a voltage and current required for driving the OTG device from the OTG device. For example, in response to a coupled external device being an OTG device that supports a USB type-C standard, the electronic device 101 may receive a CC signal or a sideband use (SBU) signal, etc. including information about a voltage or current required for driving the OTG device, from the OTG device.

In an embodiment, the electronic device 101 may control the charging circuit wherein the electronic device 101 supplies a voltage or current required by the OTG device to the OTG device on the basis of information received from the OTG device. For example, an embedded controller may forward, to a charger, a signal for controlling turn-on or turn-off operations of switches included in a converter wherein the converter outputs a voltage and current required by the OTG device. In an embodiment, the electronic device 101 may control the switch wherein the switch coupling the port to which the OTG device is coupled and the charging circuit is turned on. In an embodiment, in response to the switch coupling the port to which the OTG device is coupled and the charging circuit being turned on, power supplied from the battery or a power supply coupled to another port may be forwarded to the OTG device.

A method for forwarding power between the electronic device 101 and the external device is described below in detail with reference to FIG. 8 to FIG. 12.

Figure 8:
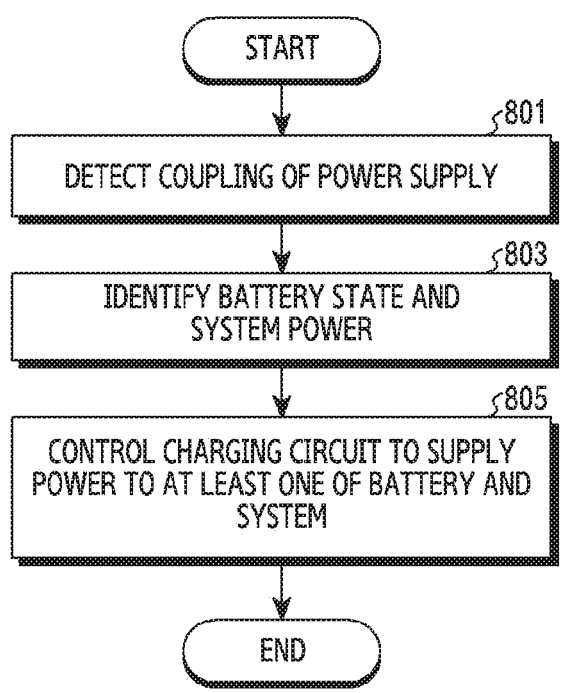
FIG. 8 is a flowchart explaining a method for controlling power according to an embodiment of the disclosure.

FIG. 8 is a flowchart explaining a method for controlling power according to an embodiment of the disclosure. FIG. 8 is a diagram for explaining a method for, in response to at least one power supply as an external device being coupled to the electronic device 101, controlling power forwarded between the electronic device 101 and the power supply.

In operation 801, the electronic device 101 may detect the coupling of at least one power supply. For example, the electronic device 101 may detect that the external device is coupled to at least some of a plurality of ports. In an embodiment, the power supply may be a travel adaptor capable of supplying power to the electronic device 101, a high-speed battery charger, a wireless charger, or a solar charger, etc. However, it is not limited to this.

In an embodiment, the electronic device 101 may detect the coupling of a power supply at least partially on the basis of information of a voltage value supplied from the power supply through a port coupled with the external device, or an ID (or an impedance value), etc. received from the power supply. In an embodiment, the electronic device 101 may detect the kind of the power supply at least partially on the basis of information, etc. received from the power supply. For example, in response to the power supply that supports a USB type-C standard being coupled to the electronic device 101, the electronic device 101 may detect the kind of the power supply at least partially on the basis of channel configuration (CC) information, etc. received from the power supply. However, a method for detecting of the coupling of the power supply or the kind of the power supply is not limited to this.

In an embodiment, detecting of the coupling of the power supply or the kind of the power supply may be performed in a port controller or an embedded controller, etc., according to an interface standard that is supported by a port of the electronic device 101 or a port of the external device. However, it is not limited to this.

In an embodiment, the electronic device 101 may control a switch wherein the switch coupling a port to which a power supply is coupled and a charging circuit is turned on. In an embodiment, in response to the switch being turned on, a charger included in the charging circuit may be operated. For example, in response to the switch being turned on, the charger may be operated automatically. In another example, in response to the switch being turned on, the charger may be operated by the control of the processor.

In operation 803, the electronic device 101 may identify a battery state, and power required by the system. In an embodiment, the electronic device 101 may receive information about a current output voltage value of a battery from the battery. The electronic device 101 may identify a charge level of the battery (or a charge amount of the battery) at least partially on the basis of the received current output voltage value of the battery. In another embodiment, the electronic device 101 may receive information about power required for driving the system from the system, thereby identifying the power required by the system. In a further embodiment, the electronic device 101 may identify power that at least one power supply coupled to the electronic device 101 is possible to supply to the electronic device 101, in addition to the battery state and the power required by the system. For example, in response to a power supply being coupled to each of two ports, the electronic device 101 may receive information about power possible to be supplied from each of the two electric supplies to the electronic device 101, and identify power summing up power possible to be supplied from each of the electric supplies, as power possible to be supplied to the electronic device 101. However, it is not limited to this.

In operation 805, the electronic device 101 may control the charging circuit, etc. wherein the charging circuit supplies power to at least one of the battery and the system.

In an embodiment, the electronic device 101 may identify an output voltage and output current of a charging circuit (or a converter) wherein the electronic device 101 supplies power to at least one of the battery and the system. For example, in response to a battery voltage not being in a full charge state, the electronic device 101 may control the charging circuit wherein the charging circuit outputs an output voltage of a battery full charge state. In an embodiment, the electronic device 101 may control the charging circuit wherein the charging circuit outputs a current that is based on power supplied from a power supply and an output voltage of the charging circuit. However, it is not limited to this. In an embodiment, the electronic device 101 may supply power from the coupled power supply, to the battery or the system.

Figure 9:
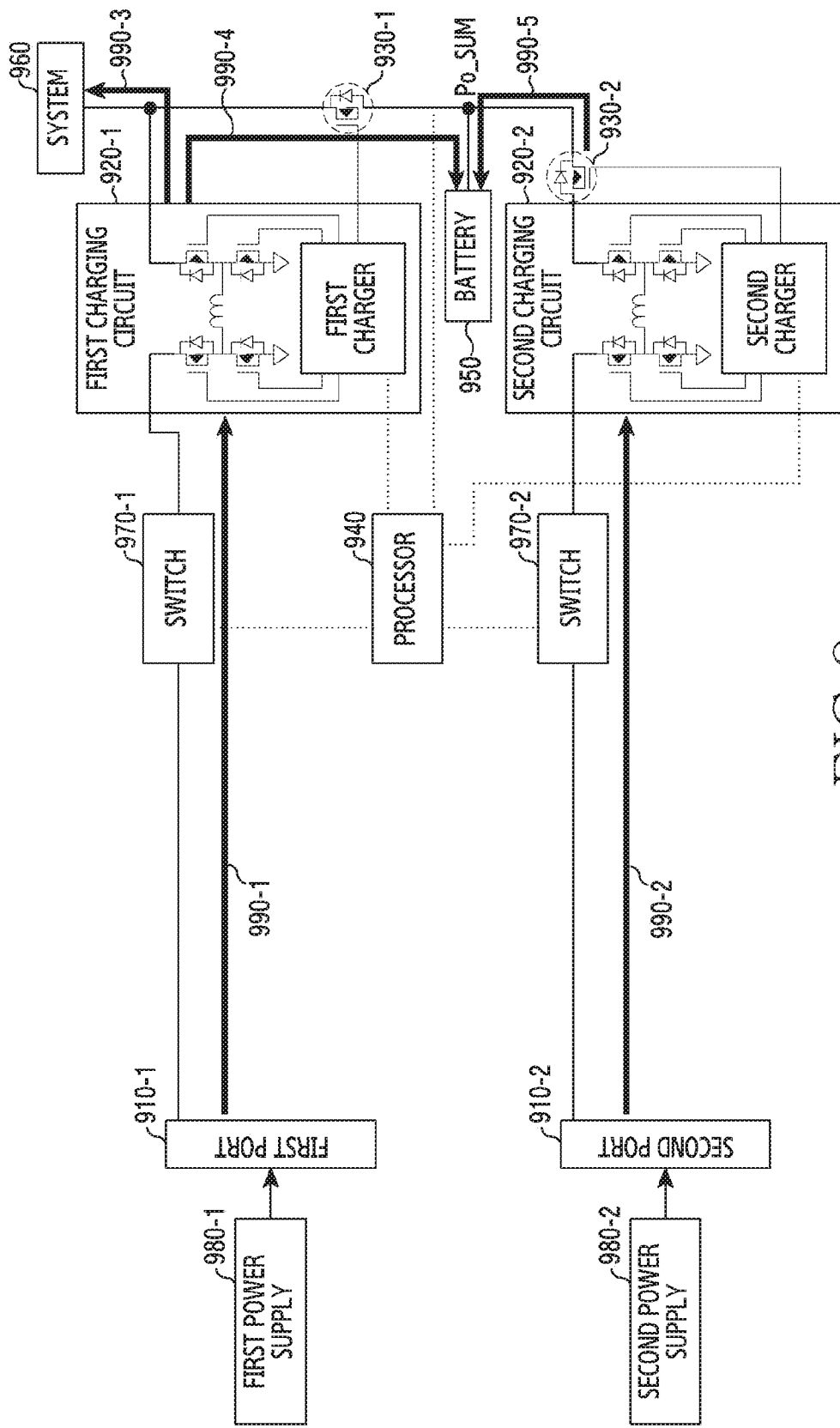
FIG. 9 is an example diagram for explaining a method for controlling power according to an embodiment of the disclosure.

FIG. 9 is an example diagram for explaining a method for controlling power according to an embodiment of the disclosure. FIG. 9 is a diagram exemplifying a method for supplying power from two electric supplies to at least one of a battery and a system on the assumption that the electric supplies are coupled to all of two ports.

Referring to FIG. 9, the electronic device 101 illustrated in FIG. 9 may include the same or similar construction with the electronic device 101 illustrated in FIG. 5. For example, the electronic device 101 may include a first port 910-1, a second port 910-2, a first charging circuit 920-1, a second charging circuit 920-2, switches 930-1 and 930-2, a processor 940, a battery 950, a system 960, and switches 970-1 and 970-2, etc. In an embodiment, the system 960 may be directly coupled with the first charging circuit 920-1. For example, the system 960 may be coupled with a terminal of the first charging circuit 920-1, and be coupled with the second charging circuit 920-2 through the switch 930-1 and the switch 930-2.

In an embodiment, the electronic device 101 may sum up power supplied from the first power supply 980-1 and power supplied from the second power supply 980-2 and forward to the battery 950. For example, the electronic device 101 may sum up power supplied from the first power supply 980-1 and power supplied from the second power supply 980-2 at a P0_SUM point and forward to the battery 950. In an embodiment, when summing up the power supplied from the first power supply 980-1 and the power supplied from the second power supply 980-2 and forwarding to the battery 950, the electronic device 101 may control the first charging circuit 920-1 and the second charging circuit 920-2 wherein the first charging circuit 920-1 and the second charging circuit 920-2 output the same voltage.

In an embodiment, in response to power supplied from the first power supply 980-1 being greater than power required by the system 960, the electronic device 101 may forward, to the system 960, the power required by the system 960 among the power supplied from the first power supply 980-1, and forward the remnant power to the battery 950. For example, in response to 40 watts (W) being supplied from the first power supply 980-1 through a path 990-1 via which the first port 910-1, the switch 970-1, and the first charging circuit 920-1 are coupled, and 25 W being supplied from the second power supply 980-2 through a path 980-2 via which the second port 910-2, the switch 970-2, and the second charging circuit 920-2 are coupled, and the power required by the system 960 being 30 W, the electronic device 101 may forward 30 W among the 40 W supplied from the first power supply 980-1, to the system 960 through a path 990-3, and forward the remaining 10 W to the battery 950 through a path 990-4 (or charge the battery 950), and forward 25 W supplied from the second power supply 980-2, to the battery 950 through a path 990-5.

In an embodiment, in response to power being simultaneously supplied from the first power supply 980-1 and the second power supply 980-2, and the system 960 requiring power, the electronic device 101 may forward the power supplied from the first power supply 980-1, preferentially to the system 960 through the first charging circuit 920-1 directly coupled with the system 960. For example, in response to the power supplied to the first power supply 980-1 being 40 W, and the power supplied from the second power supply 980-2 being 40 W, and the system 960 requiring 30 W, the electronic device 101 may forward 30 W among the 40 W supplied from the first power supply 980-1, to the system 960, and forward the remaining 10 W and the 40 W supplied from the second power supply, to the battery 950. However, it is not limited to this. For example, in response to the power supplied to the first power supply 980-1 being 20 W, and the power supplied from the second power supply 980-2 being 40 W, and the system 960 requiring 30 W, the electronic device 101 may forward 30 W among the 40 W supplied from the second power supply 980-2, to the system 960, and forward the remaining 10 W and the 20 W supplied from the first power supply 980-1, to the battery 950. However, it is not limited to this.

Figure 10:
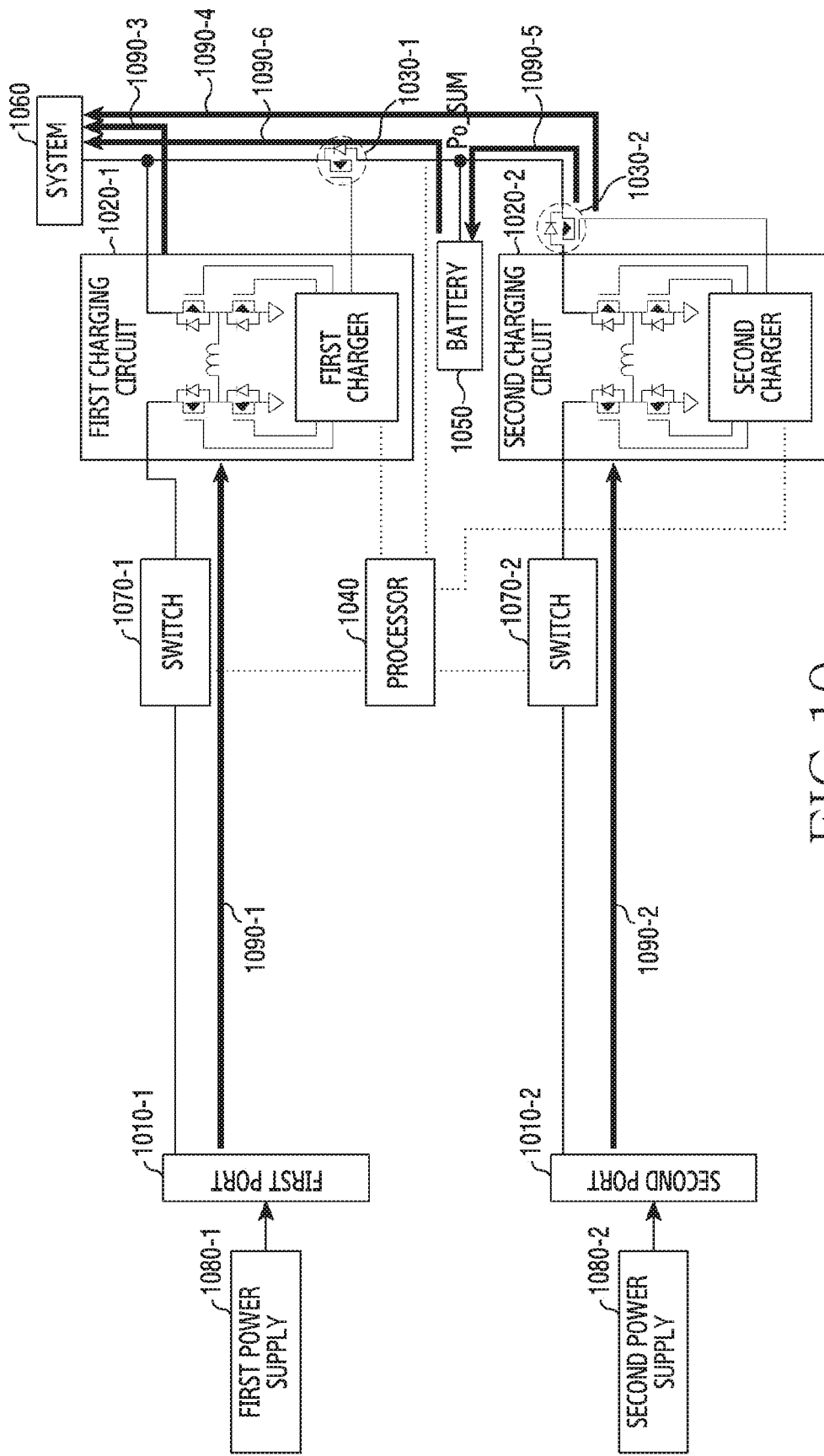
FIG. 10 is an example diagram for explaining a method for controlling power according to another embodiment of the disclosure.

FIG. 10 is an example diagram for explaining a method for controlling power according to another embodiment of the disclosure. FIG. 10 is a diagram illustrating the electronic device 101 for controlling power, in response to electric supplies being coupled to all of two ports, and the system 960 requiring power equal to or greater than power supplied from one power supply.

Referring to FIG. 10, the electronic device 101 illustrated in FIG. 10 may include the same construction as the electronic device 101 illustrated in FIG. 9. For example, the electronic device 101 may include a first port 1010-1, a second port 1010-2, a first charging circuit 1020-1, a second charging circuit 1020-2, switches 1070-1 and 1070-2, a processor 1040, a battery 1050, a system 1060, and switches 1030-1 and 1030-2, etc. In an embodiment, the system 1060 may be directly coupled with the first charging circuit 1020-1. For example, the system 1060 may be coupled with a terminal of the first charging circuit 1020-1, and be coupled with the second charging circuit 1020-2 through the switches 1030-1 and 1030-2.

In an embodiment, in response to power required by the system 1060 being greater than power that a first power supply 1080-1 or a second power supply 1080-2 is possible to supply, the electronic device 101 may forward power supplied from the first power supply 1080-1, to the system 1060, and forward at least part of power supplied from the second power supply 1080-2, to the system 1060. For example, in response to 40 watts (W) being supplied from the first power supply 1080-1 through a path 1090-1 and 25 W being supplied from the second power supply 1080-2 through a path 1090-2, and the power required by the system 1060 being 50 W, the electronic device 101 may forward all of the 40 W supplied from the first power supply 1080-1, to the system 1060 through a path 1090-3 and forward 10 W among the 25 W supplied from the second power supply 1080-2, to the system 1060 through a path 1090-4, and forward the remaining 15 W to the battery 1050 through a path 1090-5.

In another embodiment, in response to power required by the system 1060 being greater than power summing up power supplied from the first power supply 1080-1 and the second power supply 1080-2, the electronic device 101 may forward the power supplied from the first power supply 1080-1 and the power supplied from the second power supply 1080-2, to the system 1060, and forward the remaining power from the battery 1050 to the system 1060. For example, in response to 40 W being supplied from the first power supply 1080-1 through the path 1090-1 and 25 W being supplied from the second power supply 1080-2 through the path 1090-2, and the power required by the system 1060 being 70 W, the electronic device 101 may forward the 40 W supplied from the first power supply 1080-1 and the 25 W supplied from the second power supply 1080-2, to the system 1060, and forward 5 W from the battery 1050 to the system 1060 through a path 1090-6.

Figure 11:
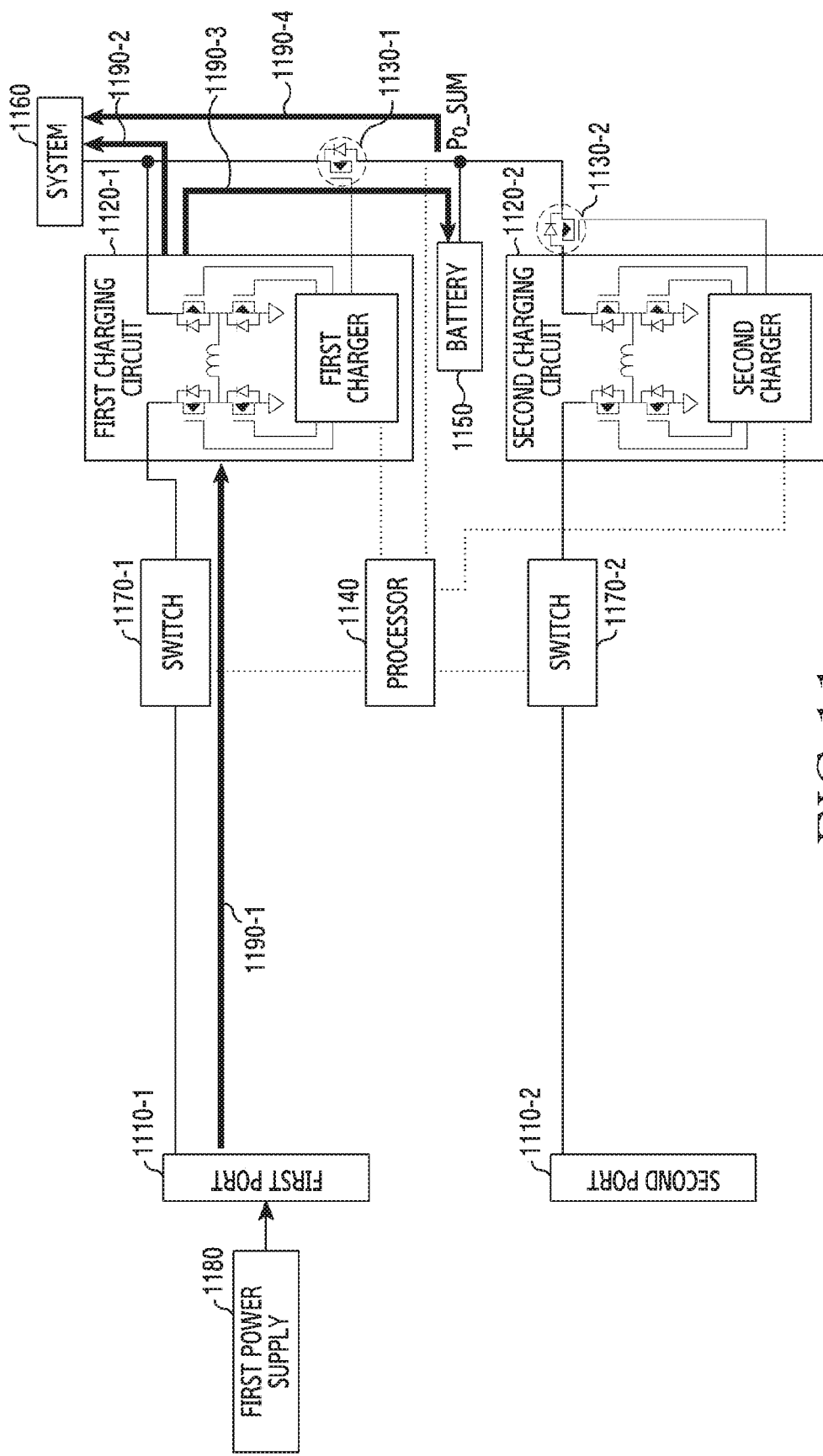
FIG. 11 is an example diagram for explaining a method for controlling power according to a further embodiment of the disclosure.

FIG. 11 is an example diagram for explaining a method for controlling power according to a further embodiment of the disclosure. FIG. 11 is a diagram illustrating the electronic device 101 for controlling power, in response to a power supply being coupled to a first port coupled with (or corresponding to) a first charging circuit directly coupled with a system, and an external device not being coupled to a second port.

Referring to FIG. 11, the electronic device 101 illustrated in FIG. 11 may include the same construction as the electronic device 101 illustrated in FIG. 9. For example, the electronic device 101 may include a first port 1110-1, a second port 1110-2, a first charging circuit 1120-1, a second charging circuit 1120-2, switches 1170-1 and 1170-2, a processor 1140, a battery 1150, a system 1160, and switches 1130-1 and 1130-2, etc. In an embodiment, the system 1160 may be directly coupled with the first charging circuit 1120-1. For example, the system 1160 may be coupled with a terminal of the first charging circuit 1120-1, and be coupled with the second charging circuit 1120-2 through the switch 1130-1 and the switch 1130-2.

In an embodiment, in response to power required by the system 1160 being less than power that the first power supply 1180 is possible to supply, the electronic device 101 may forward the power required by the system 1160 among the power supplied from the first power supply 1180, to the system 1160, and forward the remnant power to the battery 1150. For example, in response to 40 watts (W) being supplied from the first power supply 1180 through a path 1190-1 and the power required by the system 1160 being 30 W, the electronic device 111 may supply 30 W to the system 1160 through the path 1190-2 among the 40 W supplied from the first power supply 1180 and forward the remnant 10 W to the battery 1150 through a path 1190-3.

In another embodiment, in response to power required by the system 1160 being greater than power that the first power supply 1180 is possible to supply, the electronic device 111 may forward all the power supplied from the first power supply 1180, to the system 1160, and forward the insufficient remnant power from the battery 1150 to the system 1160 through a path 1190-4. For example, in response to 40 watts (W) being supplied from the first power supply 1180 and the power required by the system 1160 being 50 W, the electronic device 111 may forward all of the 40 W supplied from the first power supply 1180, to the system 1160, and forward 10 W from the battery 1150 to the system 1160.

Figure 12:
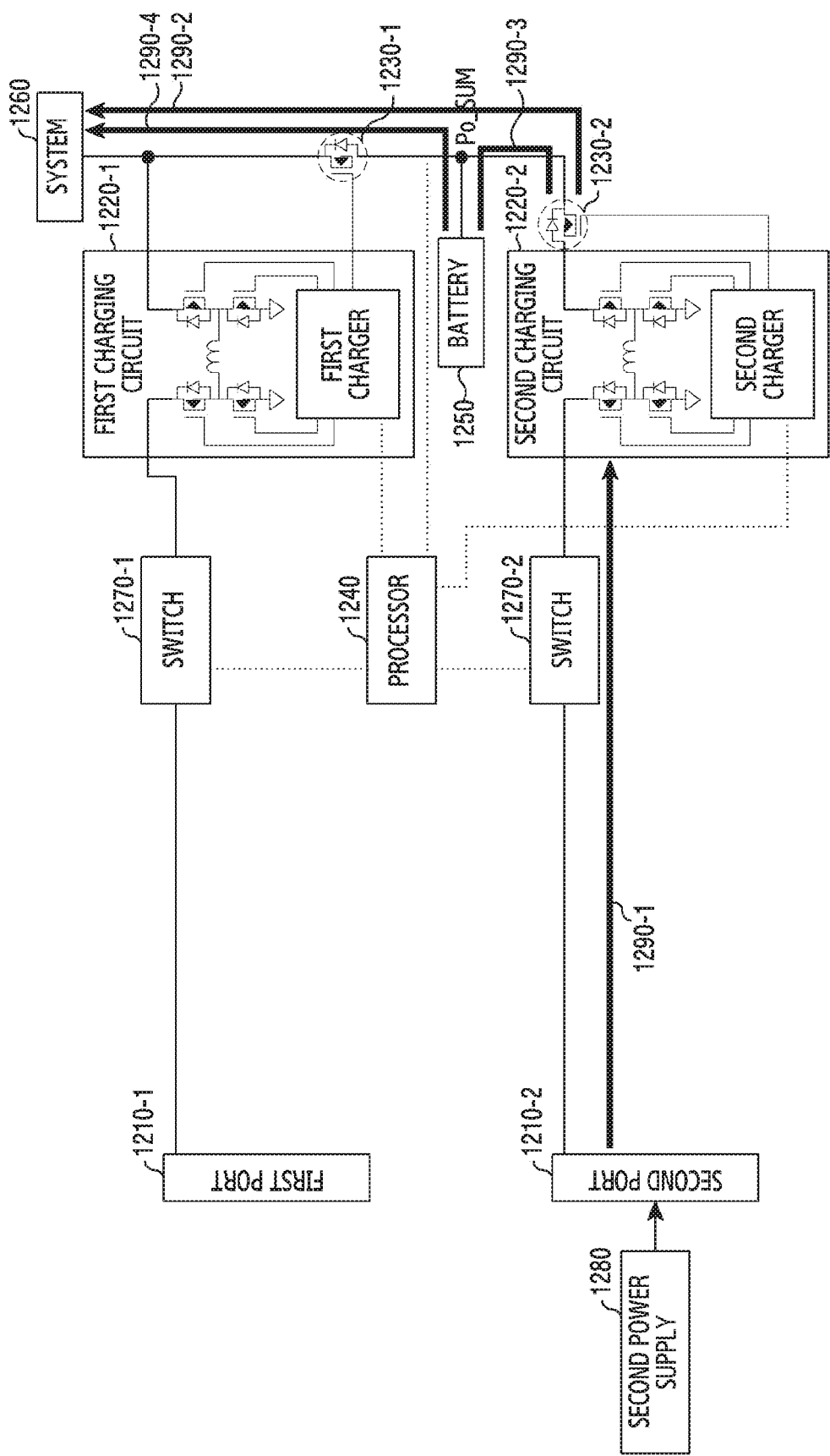
FIG. 12 is an example diagram for explaining a method for controlling power according to a yet another embodiment of the disclosure.

FIG. 12 is an example diagram for explaining a method for controlling power according to a yet another embodiment of the disclosure. FIG. 12 is a diagram illustrating the electronic device 101 for controlling power, in response to an external device not being coupled to a first port coupled with (or corresponding to) a first charging circuit directly coupled with a system, and an power supply being coupled to a second port.

Referring to FIG. 12, the electronic device 101 illustrated in FIG. 12 may include the same construction as the electronic device 101 illustrated in FIG. 9. For example, the electronic device 101 may include a first port 1210-1, a second port 1210-2, a first charging circuit 1220-1, a second charging circuit 1220-2, switches 1270-1 and 1270-2, a processor 1240, a battery 1250, a system 1260, and switches 1230-1 and 1230-2, etc. In an embodiment, the system 1260 may be directly coupled with the first charging circuit 1220-1. For example, the system 1260 may be coupled with a terminal of the first charging circuit 1220-1, and be coupled with the second charging circuit 1220-2 through the switches 1230-1 and 1230-2.

In an embodiment, in response to power required by the system 1260 being less than power that a second power supply 1280 is possible to supply, the electronic device 101 may forward the power required by the system 1260 among the power supplied from the first power supply 1280, to the system 1260, and forward the remnant power to the battery 1250. For example, in response to 40 watts (W) being supplied from the second power supply 1280 through a path 1290-1 and the power required by the system 1260 being 30 W, the electronic device 101 may supply 30 W to the system 1260 through the path 1290-2 among the 40 W supplied from the second power supply 1280 and forward the remnant 10 W to the battery 1250 through a path 1290-3.

In another embodiment, in response to the power required by the system 1260 being greater than the power that the second power supply 1280 is possible to supply, the electronic device 101 may forward all of the power supplied from the second power supply 1280, to the system 1260, and forward the remnant power from the battery 1250 to the system 1260. For example, in response to 40 watts (W) being supplied from the second power supply 1280 through the path 1290-1 and the power required by the system 1260 being 50 W, the electronic device 101 may supply all of the 40 W supplied from the second power supply 1280, to the system 1260, and forward 10 W from the battery 1250 to the system 1260 through a path 1290-4.

Figure 13:
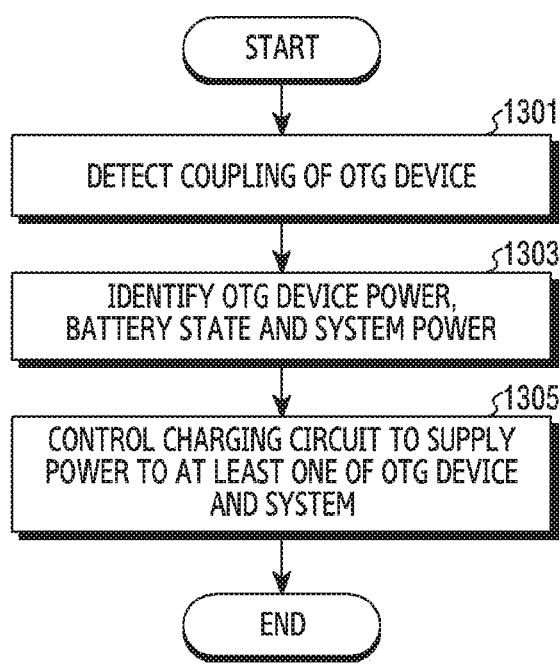
FIG. 13 is a flowchart explaining a method for controlling power according to another embodiment of the disclosure.

FIG. 13 is a flowchart explaining a method for controlling power according to another embodiment of the disclosure. FIG. 13 is a diagram for explaining a method for, in response to at least one OTG device as an external device being coupled to the electronic device 101, controlling power forwarded between the electronic device 101 and the OTG device.

In operation 1301, the electronic device 101 may detect the coupling of at least one OTG device. For example, the electronic device 101 may detect that the OTG device is coupled to at least some of a plurality of ports. In an embodiment, the OTG device may include a device needing power from the electronic device 101 like an accessory, etc. such as a USB memory, an earphone. However, it is not limited to this.

In an embodiment, the electronic device 101 may detect the coupling of the OTG device at least partially on the basis of information of a voltage value supplied from the OTG device through a port coupled with the OTG device, or an ID (or an impedance value) received from the OTG device, etc. In an embodiment, the electronic device 101 may detect the kind of the OTG device at least partially on the basis of information, etc. received from the OTG device. For example, in response to an OTG device that supports a USB type-C standard being coupled to the electronic device 101, the electronic device 101 may detect the kind of the OTG device at least partially on the basis of channel configuration (CC) information, etc. received from the OTG device. However, a method for detecting the coupling of the OTG device or the kind of the OTG device is not limited to this.

In an embodiment, detecting of the coupling of the OTG device or the kind of the OTG device may be performed in a port controller or an embedded controller, etc., according to an interface standard that is supported by a port of the electronic device 101 or a port of the external device. However, it is not limited to this.

In operation 1303, the electronic device 101 may identify power required by the OTG device, a battery state, and power required by a system.

In an embodiment, the electronic device 101 may receive information about a voltage and current required for driving the OTG device from the OTG device. For example, in response to the coupled external device being an OTG device that supports a USB type-C standard, the electronic device 101 may receive a CC signal or a sideband use (SBU) signal, etc. including information about a voltage or current required for driving the OTG device from the OTG device, thereby identifying the power required by the OTG device.

In an embodiment, the electronic device 101 may identify the battery state and the power required by the system. In an embodiment, the electronic device 101 may receive information about a current output voltage value of a battery from the battery. The electronic device 101 may identify a charge level of the battery (or a charge amount of the battery) at least partially on the basis of the received current output voltage value of the battery. In another embodiment, the electronic device 101 may receive information about the power required for driving the system from the system, thereby identifying the power required by the system.

In operation 1305, the electronic device 101 may control a charging circuit, etc. wherein the charging circuit supplies power to at least one of the OTG device and the system.

In an embodiment, the electronic device 101 may control the charging circuit wherein the electronic device 101 supplies a voltage or current required by the OTG device to the OTG device on the basis of information received from the OTG device. For example, the embedded controller may forward, to a charger, a signal for controlling turn-on or turn-off operations of switches included in a converter wherein the converter outputs a voltage and current required by the OTG device. In an embodiment, the electronic device 101 may control the switch wherein the switch coupling a port to which the OTG device is coupled and the charging circuit is turned on.

In another embodiment, in response to a plurality of OTG devices being coupled to a plurality of ports, the electronic device 101 may control a plurality of charging circuits wherein the electronic device 101 forwards power from the battery to the plurality of OTG devices.

In a further embodiment, the electronic device 101 may forward power to at least one OTG device and system. For example, the electronic device 101 may control the charging circuit wherein the electronic device 101 forwards power required by the system to the system and supplies a voltage or current required by the OTG device to the OTG device.

Figure 14:
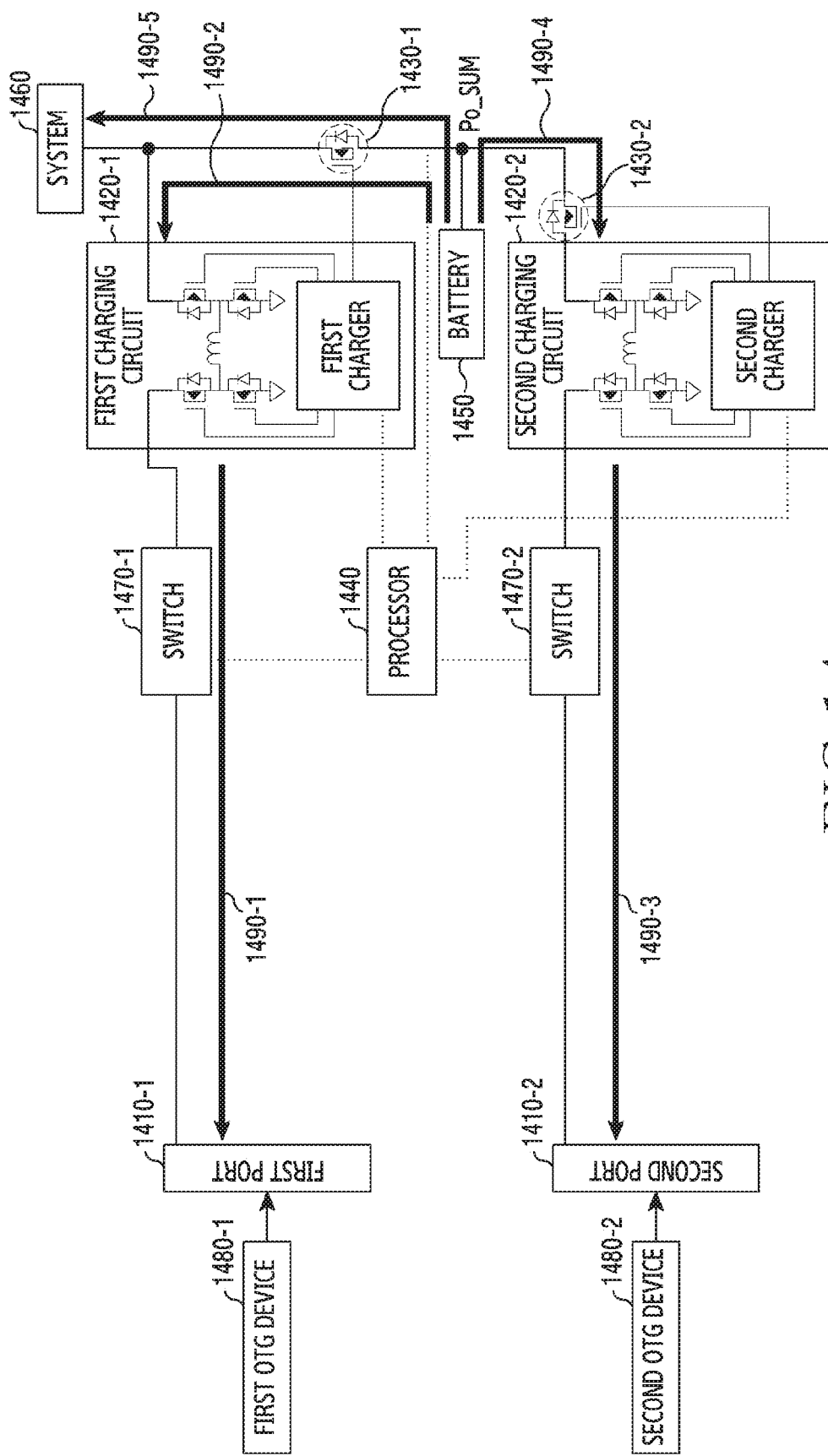
FIG. 14 is an example diagram for explaining a method for controlling power according to an embodiment of the disclosure.

FIG. 14 is an example diagram for explaining a method for controlling power according to an embodiment of the disclosure. FIG. 14 is a diagram illustrating the electronic device 101 for controlling power forwarding from a battery to OTG devices and a system in response to the OTG devices being coupled to all of two ports.

Referring to FIG. 14, the electronic device 101 illustrated in FIG. 14 may include the same construction as the electronic device 101 illustrated in FIG. 9. For example, the electronic device 101 may include a first port 1410-1, a second port 1410-2, a first charging circuit 1420-1, a second charging circuit 1420-2, switches 1470-1 and 1470-2, a processor 1440, a battery 1450, a system 1460, and switches 1430-1 and 1430-2, etc. In an embodiment, the system 1460 may be directly coupled with the first charging circuit. For example, the system 1460 may be coupled with a terminal of the first charging circuit 1420-1, and be coupled with the second charging circuit 1420-2 through the switch 1430-1 and the switch 1430-2.

In an embodiment, the electronic device 101 may forward power from the battery 1450 to the system 1460, the first OTG device 1480-1, and the second OTG device 1480-2. For example, the electronic device 101 may forward power to the system 1460 through a path 1490-5, and forward power to the first OTG device 1480-1 through a path 1490-1 and a path 1490-2, and forward power to the second OTG device 1480-2 through a path 1490-3 and a path 1490-4. For example, in response to the system 1460 requiring 20 W, and the first OTG device 1480-1 requiring 30 W, and the second OTG device 1480-2 requiring 40 W, the electronic device 101 may forward 20 W to the system 1460, and forward 30 W to the first OTG device 1480-1, and forward 40 W to the second OTG device 1480-2.

FIG. 14 illustrates a case that the OTG devices are coupled to all of the first port 1410-1 and the second port 1410-2, but even in response to the OTG device being coupled to any one port among the first port 1410-1 and the second port 1410-2, and there not being an external device coupled to the other port, it an embodiment of the disclosure may be applied identically or similarly with FIG. 14, and a detailed description is omitted.

Figure 15:
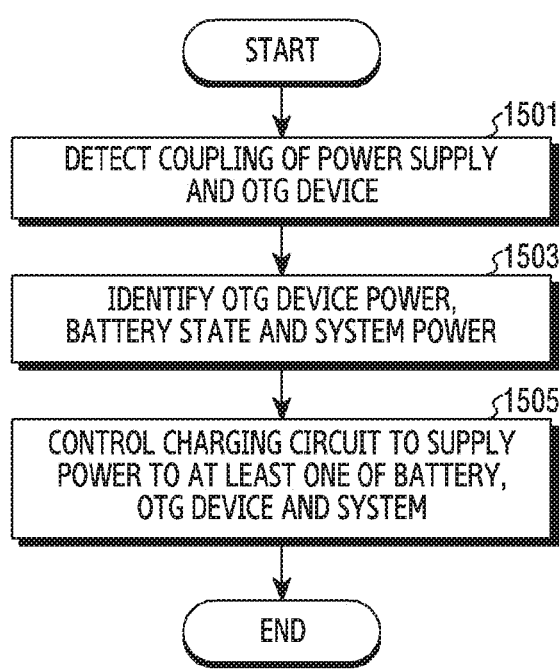
FIG. 15 is a flowchart explaining a method for controlling power according to a further embodiment of the disclosure.

FIG. 15 is a flowchart explaining a method for controlling power according to a further embodiment of the disclosure. FIG. 15 is a diagram for explaining a method for, in response to a power supply and an OTG device as external devices being coupled to the electronic device 101, controlling power forwarded between the electronic device 101 and the external devices.

In operation 1501, the electronic device 101 may detect the coupling of the power supply and the OTG device. For example, the electronic device 101 may detect that the power supply is coupled to at least one port among a plurality of ports, and the OTG device is coupled to another at least one port.

In an embodiment, the electronic device 101 may detect the coupling of the power supply at least partially on the basis of information of a voltage value supplied from the power supply through a port coupled with the power supply, or an ID (or an impedance value), etc. received from the power supply. In an embodiment, the electronic device 101 may detect the kind of the power supply at least partially on the basis of information, etc. received from the power supply. For example, in response to a power supply that supports a USB type-C standard being coupled to the electronic device 101, the electronic device 101 may detect the kind of the power supply at least partially on the basis of channel configuration (CC) information, etc. received from the power supply. However, a method for detecting of the coupling of the power supply or the kind of the power supply is not limited to this.

In an embodiment, the electronic device 101 may control a switch wherein the switch coupling a port coupled with a power supply and a charging circuit coupled with the port is turned on. In an embodiment, in response to the switch being turned on, a charger included in the charging circuit may be operated. For example, in response to the switch being turned on, the charger may be operated automatically. In another example, in response to the switch being turned on, the charger may be operated by the control of a processor.

In an embodiment, the electronic device 101 may detect the coupling of the OTG device at least partially on the basis of information of a voltage value supplied from the OTG device through a port coupled with the OTG device, or an ID (or an impedance value), etc. received from the OTG device. In an embodiment, the electronic device 101 may detect the kind of the OTG device at least partially on the basis of information, etc. received from the OTG device. For example, in response to an OTG device that supports a USB type-C standard being coupled to the electronic device 101, the electronic device 101 may detect the kind of the OTG device at least partially on the basis of channel configuration (CC) information, etc. received from the OTG device. However, a method for detecting the coupling of the OTG device or the kind of the OTG device is not limited to this.

In an embodiment, detecting of the coupling of the power supply and the OTG device or the kinds of the power supply and the OTG device may be performed in a port controller or an embedded controller, etc., according to an interface standard that is supported by a port of the electronic device 101 or ports of the external devices. However, it is not limited to this.

In operation 1503, the electronic device 101 may identify power required by the OTG device, a battery state, and power required by a system.

In an embodiment, the electronic device 101 may receive information about a voltage and current required for driving the OTG device from the OTG device. For example, in response to a coupled external device being an OTG device that supports a USB type-C standard, the electronic device 101 may receive a CC signal or a sideband use (SBU) signal, etc. including information about a voltage or current required for driving the OTG device from the OTG device, thereby identifying the power required by the OTG device.

In an embodiment, the electronic device 101 may identify the battery state and the power required by the system. In an embodiment, the electronic device 101 may receive information about a current output voltage value of a battery from the battery. The electronic device 101 may identify a charge level of the battery (or a charge amount of the battery) at least partially on the basis of the received current output voltage value of the battery. In another embodiment, the electronic device 101 may receive information about power required for driving the system from the system, thereby identifying the power required by the system.

Though not illustrated in FIG. 15, in an embodiment, the electronic device 101 may identify power that at least one power supply coupled to the electronic device 101 is possible to supply to the electronic device 101.

In operation 1505, the electronic device 101 may control the charging circuit, etc. wherein the charging circuit supplies power to at least one of the battery, the OTG device, and the system.

In an embodiment, the electronic device 101 may identify an output voltage and output current of a charging circuit (or a converter) wherein the electronic device 101 supplies power to at least one of the battery and the system. For example, in response to a battery voltage not being in a full charge state, the electronic device 101 may control a charging circuit wherein the charging circuit outputs an output voltage of a battery full charge state. In an embodiment, the electronic device 101 may control the charging circuit wherein the charging circuit outputs a current that is based on power supplied from a power supply and an output voltage of the charging circuit. However, it is not limited to this.

In an embodiment, the electronic device 101 may control the charging circuit wherein the electronic device 101 supplies a voltage or current required by the OTG device to the OTG device, on the basis of information received from the OTG device. For example, an embedded controller may forward, to a charger, a signal for controlling turn-on or turn-off operations of switches included in a converter wherein the converter outputs a voltage and current required by the OTG device. In an embodiment, the electronic device 101 may control the switch wherein the switch coupling the port to which the OTG device is coupled and the charging circuit is turned on.

In an embodiment, the electronic device 101 may forward power inputted from the coupled power supply, to the battery, the OTG device, and the system at the same time. However, it is not limited to this.

Figure 16:
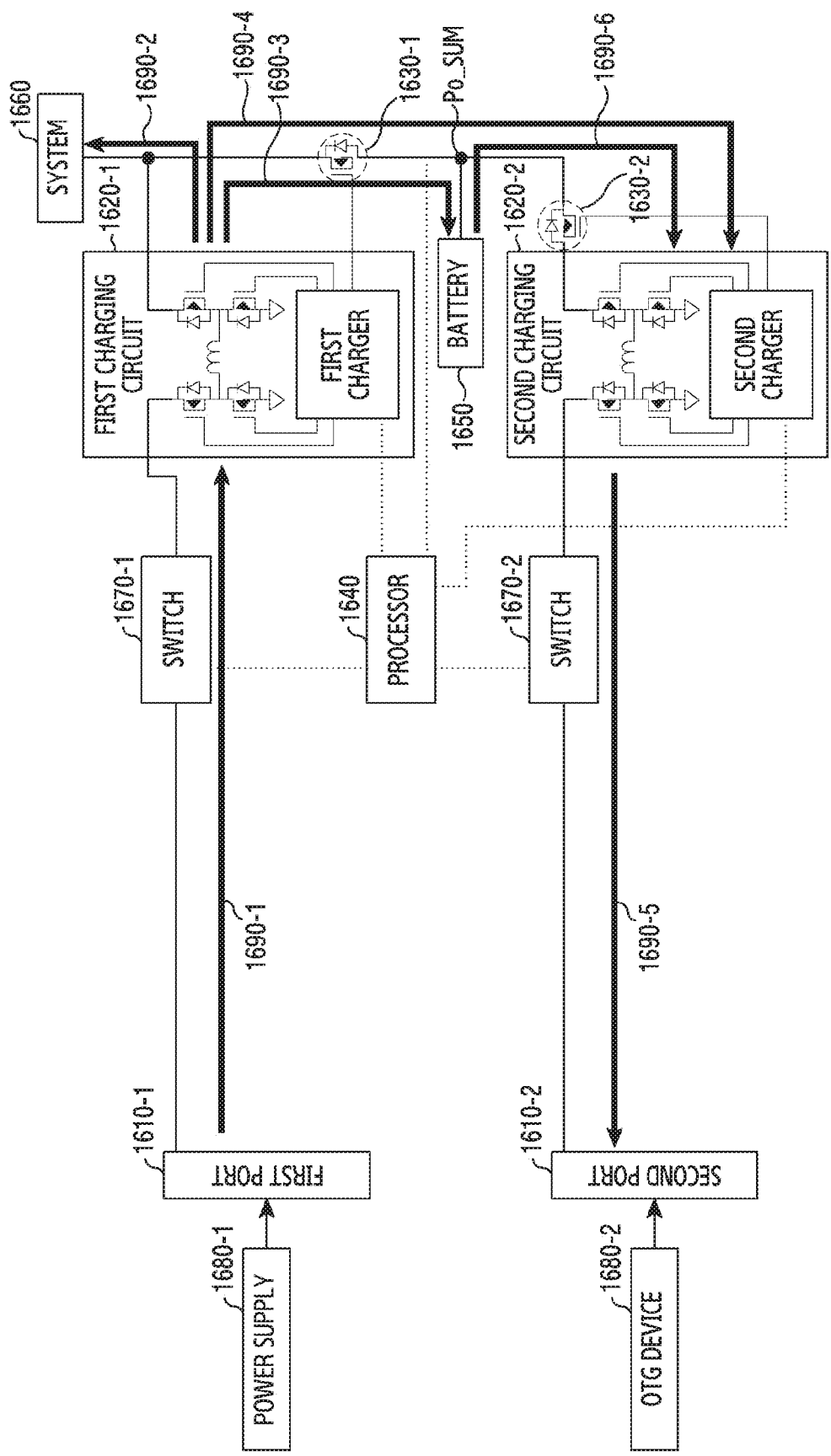
FIG. 16 is an example diagram for explaining a method for controlling power according to an embodiment of the disclosure.

FIG. 16 is an example diagram for explaining a method for controlling power according to an embodiment of the disclosure. FIG. 16 is a diagram illustrating the electronic device 101 for controlling power forwarding between a power supply, an OTG device, a battery, and a system, in response to the power supply being coupled to one port, and the OTG device being coupled to another port.

Referring to FIG. 16, the electronic device 101 illustrated in FIG. 16 may include the same construction as the electronic device 101 illustrated in FIG. 9. For example, the electronic device 101 may include a first port 1610-1, a second port 1610-2, a first charging circuit 1620-1, a second charging circuit 1620-2, switches 1670-1 and 1670-2, a processor 1640, a battery 1650, a system 1660, and switches 1630-1 and 1630-2, etc. In an embodiment, the system 1660 may be directly coupled with the first charging circuit 1620-1. For example, the system 1660 may be coupled with a terminal of the first charging circuit 1620-2, and be coupled with the second charging circuit 1620-1 through the switches 1630-1 and 1630-2.

In an embodiment, the electronic device 101 may forward power supplied from a power supply 1680-1 to at least one of the system 1660 through paths 1690-1 and 1690-2, the battery 1650 through a path 1690-3, and an OTG device 1680-2 through paths 1690-4 and 1690-5.

In an embodiment, in response to power supplied from the power supply 1680-1 being greater than power required by the system 1660 and the OTG device 1680-2, the electronic device 101 may forward the power required by the system 1660 and the OTG device 1680-2 to the system 1660 and the OTG device 1680-2, and forward the remaining power to the battery 1650. For example, in response to 50 W being supplied from the power supply 1680-1, and the system 1660 requiring 20 W, and the OTG device 1680-2 doing 20 W, the electronic device 101 may forward 20 W to the system 1660, 20 W to the OTG device 1680-2, and forward the remaining 10 W among the 50 W to the battery 1650.

In an embodiment, in response to the power supplied from the power supply 1680-1 being the same as power required by the system 1660, the electronic device 101 may forward the power supplied from the power supply 1680-1, to the system 1660, and forward power required by the OTG device 1680-2, from the battery 1650 to the OTG device 1680-2 through paths 1690-6 and 1690-5.

FIG. 16 exemplifies a case that the power supply 1680-1 is coupled to the first port 1610-1 and the OTG device 1680-2 is coupled to the second port 1610-2, but even in response to the OTG device 1680-2 being coupled to the first port 1610-1 and the power supply 1680-1 being coupled to the second port 1610-2, an embodiment of the disclosure may be applied identically or similarly with this and thus, a detailed description of a case that the OTG device 1680-2 is coupled to the first port 1610-1 and the power supply 1680-1 is coupled to the second port 1610-2 is omitted.

An electronic device according to various embodiments of the disclosure may include a first port and a second port, a system, a battery, a first charging circuit electrically coupled with the first port, the system, and the battery, and a second charging circuit electrically coupled with the second port, the system, the battery, and the first charging circuit.

In an embodiment, the electronic device may further include a processor for, in response to an external device being coupled to at least one of the first port and the second port, detecting the coupling of the external device.

In an embodiment, in response to a first power supply being coupled to the first port and a second power supply being coupled to the second port, the first charging circuit may forward power inputted from the first power supply, to the battery, and the second charging circuit may forward power inputted from the second power supply, to the battery.

In an embodiment, while the first charging circuit forwards the power inputted from the first power supply to the battery and the second charging circuit forwards the power inputted from the second power supply to the battery, the first charging circuit and the second charging circuit may output the same voltage.

In an embodiment, in response to the battery not being in a full charge state, the first charging circuit and the second charging circuit may output the same voltage as a voltage that the battery outputs in the full charge state.

In an embodiment, in response to power required by the system being less than the power inputted from the first power supply, the processor may control the first charging circuit and the second charging circuit to forward the power required by the system among the power inputted from the first power supply, to the system, and forward the remnant power to the battery, and forward the power inputted from the second power supply to the battery.

In an embodiment, in response to the power required by the system being greater than the power inputted from the first power supply, and being less than power summing up the power inputted from the first power supply and the power inputted from the second power supply, the processor may control the first charging circuit and the second charging circuit to forward the power inputted from the first power supply to the system, and forward power corresponding to power subtracting the power inputted from the first power supply from the power required by the system, among the power inputted from the second power supply, to the system, and forward the remnant power to the battery.

In an embodiment, in response to the power required by the system being greater than power summing up the power inputted from the first power supply and the power inputted from the second power supply, the processor may control the first charging circuit and the second charging circuit to forward the power inputted from the first power supply and the power inputted from the second power supply, to the system, and forward power corresponding to power subtracting the power inputted from the first power supply and the power inputted from the second power supply from the power required by the system, from the battery to the system.

In an embodiment, in response to an power supply being coupled to any one port among the first port and the second port, and an external device not being coupled to the other port, the processor may control a charging circuit corresponding to the port coupled with the power supply, to forward power inputted from the power supply to at least one of the battery and the system.

In an embodiment, the first power supply or the second power supply may be a travel adaptor, a high-speed battery charger, a wireless charger, or a solar charger.

In an embodiment, in response to an on the go (OTG) device being coupled to at least one of the first port and the second port, the processor may control a charging circuit electrically coupled with the port coupled with the OTG device, to forward power from the battery to at least one of the OTG device and the system, at least partially on the basis of power required by the OTG device and power required by the system.

In an embodiment, in response to an power supply being coupled to any one port among the first port and the second port, and an OTG device being coupled to the other port, the processor may control the first charging circuit and the second charging circuit to, in response to power required by the system and power required by the OTG device being less than power inputted from the power supply, forward the power required by the system and the power required by the OTG device to the system and the OTG device among the power inputted from the power supply, and supply the remnant power to the battery.

In an embodiment, in response to the power required by the system and the power required by the OTG device being greater than the power inputted from the power supply, the processor may forward the power inputted from the power supply to the system and the OTG device, and forward power corresponding to power subtracting the power inputted from the power supply from the power required by the system and the power required by the OTG device, from the battery to the OTG device.

In an embodiment, the processor may include an embedded controller or a port controller.

In an embodiment, the first charging circuit may include a first buck boost converter and a first charger, and the second charging circuit may include a second buck boost converter and a second charger.

In an embodiment, the first buck boost converter and the second buck boost converter may each include four field effect transistors (FETs) and an inductor.

In an embodiment, the electronic device may further include a first switch electrically coupled with the first charging circuit, the battery and the system and turned on or turned off by the first charging circuit, and a second switch electrically coupled with the second charging circuit, the battery, and the first switch and turned on or turned off by the second charging circuit.

In an embodiment, in response to power is inputted from the electric supply coupled to the first port and the battery is in a full charging state, the first switch may be turned off by the first charging circuit.

In an embodiment, the electronic device may further include a third switch electrically coupled with the first port and the first charging circuit, and a fourth switch electrically coupled with the second port and the second charging circuit.

In an embodiment, the electronic device may further include a third port and a third charging circuit electrically coupled with the third port, the battery, the first charging circuit, and the second charging circuit.

Also, a data structure used in the aforementioned embodiment of the disclosure may be recorded in a computer-readable recording medium through various means. The computer-readable recording medium includes a storage medium such as a magnetic storage medium (for example, a read only memory (ROM), a floppy disc, a hard disc, etc.) and/or an optical reading medium (for example, a compact disc-ROM (CD-ROM), a digital versatile disc (DVD), etc.).

The disclosure has been now described mainly on preferred embodiments thereof. A person having ordinary skill in the art to which the disclosure pertains would be able to understand that the disclosure can be implemented in a modified form within a scope not departing from a substantial characteristic of the disclosure. Therefore, the disclosed embodiments should be taken into consideration in a descriptive aspect, not in a restrictive aspect. The scope of the disclosure is presented in claims, not in the above-mentioned description, and it would have to be construed that all differences within a scope equivalent thereto are included in the disclosure.

What is claimed is:

1. An electronic device comprising:
a first port and a second port;
a system;
a battery;
a first charging circuit electrically coupled with the first port, the system, and the battery;
a second charging circuit electrically coupled with the second port, the system, the battery, and the first charging circuit; and
a processor electrically coupled with the first charging circuit and the second charging circuit, and configured to:
in response to a first power supply being coupled to the first port and a second power supply being coupled to the second port, the first charging circuit forwards power inputted from the first power supply to the battery and the second charging circuit forwards power inputted from the second power supply to the battery.

2. The electronic device of claim 1, wherein the processor is configured to, in response to an external device being coupled to at least one of the first port and the second port, detecting the coupling of the external device.

3. The electronic device of claim 1, wherein while the first charging circuit forwards the power inputted from the first power supply to the battery and the second charging circuit forwards the power inputted from the second power supply to the battery, the first charging circuit and the second charging circuit output the same voltage.

4. The electronic device of claim 3, wherein in response to the battery not being in a full charge state, the first charging circuit and the second charging circuit output the same voltage as a voltage that the battery outputs in the full charge state.

5. The electronic device of claim 1, wherein in response to power required by the system being less than the power inputted from the first power supply,
the processor controls the first charging circuit and the second charging circuit to forward the power required by the system among the power inputted from the first power supply, to the system, and forward the remnant power to the battery, and forward the power inputted from the second power supply to the battery.

6. The electronic device of claim 1, wherein in response to the power required by the system being greater than the power inputted from the first power supply, and being less than power summing up the power inputted from the first power supply and the power inputted from the second power supply,
the processor controls the first charging circuit and the second charging circuit to forward the power inputted from the first power supply to the system, and forward power corresponding to power subtracting the power inputted from the first power supply from the power required by the system, among the power inputted from the second power supply, to the system, and forward the remnant power to the battery.

7. The electronic device of claim 1, wherein in response to the power required by the system being greater than power summing up the power inputted from the first power supply and the power inputted from the second power supply,
the processor controls the first charging circuit and the second charging circuit to forward the power inputted from the first power supply and the power inputted from the second power supply, to the system, and forward power corresponding to power subtracting the power inputted from the first power supply and the power inputted from the second power supply from the power required by the system, from the battery to the system.

8. The electronic device of claim 2, wherein in response to a power supply being coupled to any one port among the first port and the second port, and the external device not being coupled to the other port, the processor controls a charging circuit corresponding to the port coupled with the power supply, to forward power inputted from the power supply to at least one of the battery and the system.

9. The electronic device of claim 2, wherein the first power supply or the second power supply is a travel adaptor, a high-speed battery charger, a wireless charger, or a solar charger.

10. The electronic device of claim 2, wherein in response to an on the go (OTG) device being coupled to at least one of the first port and the second port, the processor controls a charging circuit electrically coupled with the port coupled with the OTG device, to forward power from the battery to at least one of the OTG device and the system, at least partially on the basis of power required by the OTG device and power required by the system.

11. The electronic device of claim 2, wherein in response to a power supply being coupled to any one port among the first port and the second port, and an OTG device being coupled to the other port, the processor controls the first charging circuit and the second charging circuit to, in response to power required by the system and power required by the OTG device being less than power inputted from the power supply, forward the power required by the system and the power required by the OTG device to the system and the OTG device among the power inputted from the power supply, and supply the remnant power to the battery.

12. The electronic device of claim 11, wherein in response to the power required by the system and the power required by the OTG device being greater than the power inputted from the power supply, the processor forwards the power inputted from the power supply to the system and the OTG device, and forwards power corresponding to power subtracting the power inputted from the power supply from the power required by the system and the power required by the OTG device, from the battery to the OTG device.

13. The electronic device of claim 2, wherein the processor comprises an embedded controller or a port controller.

14. The electronic device of claim 1, wherein the first charging circuit comprises a first buck boost converter and a first charger, and the second charging circuit comprises a second buck boost converter and a second charger.

15. An electronic device comprising:
a first port and a second port;
a system;
a battery;
a first charging circuit electrically coupled with the first port, the system, and the battery;
a second charging circuit electrically coupled with the second port, the system, the battery, and the first charging circuit; and
a processor electrically coupled with the first charging circuit and the second charging circuit, and configured to:
in response to an external device being coupled to at least one of the first port and the second port, detecting the coupling of the external device, and
in response to a first power supply being coupled to the first port and a second power supply being coupled to the second port, the first charging circuit forwards power inputted from the first power supply to the battery and the second charging circuit forwards power inputted from the second power supply to the battery.

* * * * *